(12) United States Patent
Fraczek et al.

(10) Patent No.: US 11,339,619 B2
(45) Date of Patent: *May 24, 2022

(54) ROTATING CONTROL DEVICE FOR LAND RIGS

(71) Applicant: AMERIFORGE GROUP INC., Houston, TX (US)

(72) Inventors: Justin Fraczek, Spring, TX (US); Shawn Paul McClosky, Montgomery, TX (US); George James Michaud, Katy, TX (US); Alexander John MacGregor, Kirkcudbright (GB); Fukun Lai, Houston, TX (US)

(73) Assignee: AMERIFORGE GROUP INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/212,515

(22) Filed: Mar. 25, 2021

(65) Prior Publication Data

US 2021/0207447 A1 Jul. 8, 2021

Related U.S. Application Data

(63) Continuation of application No. 16/984,874, filed on Aug. 4, 2020, now Pat. No. 10,995,573, which is a
(Continued)

(51) Int. Cl.
*E21B 21/08* (2006.01)
*E21B 33/08* (2006.01)
(Continued)

(52) U.S. Cl.
CPC ............ *E21B 21/08* (2013.01); *E21B 33/085* (2013.01); *F16J 15/022* (2013.01); *F16J 15/06* (2013.01); *E21B 3/02* (2013.01)

(58) Field of Classification Search
CPC .......... E21B 21/08; E21B 3/02; E21B 33/085; F16J 15/022; F16J 15/06
See application file for complete search history.

(56) References Cited

U.S. PATENT DOCUMENTS

| 4,815,191 A | 3/1989 | Garman et al. |
| 5,823,541 A | 10/1998 | Dietle et al. |

(Continued)

FOREIGN PATENT DOCUMENTS

| WO | 2011117383 A1 | 9/2011 |
| WO | 2019213145 A1 | 11/2019 |
| WO | 2019213162 A1 | 11/2019 |

OTHER PUBLICATIONS

Applicant reply to Office Action dated Dec. 23, 2020, in U.S. Appl. No. 16/984,831, filed Aug. 4, 2020, reply submitted on Jan. 11, 2021.
(Continued)

*Primary Examiner* — James G Sayre
(74) *Attorney, Agent, or Firm* — Basil M. Angelo; Angelo IP

(57) ABSTRACT

A seal and bearing includes a seal and bearing housing, a rotatable mandrel disposed within an inner aperture of the seal and bearing housing, an upper seal carrier attached to a top side of the seal and bearing housing having a dynamic sealing element that contacts the rotatable mandrel, a plurality of tapered-thrust bearings to facilitate rotation of the rotatable mandrel including top tapered-thrust bearings indirectly mounted at a positive offset angle from a perpendicular line to a longitudinal axis of the rotating control device and bottom tapered-thrust bearings indirectly mounted at a negative offset angle from the perpendicular line to the longitudinal axis of the rotating control device, a preload spacer disposed between the top and bottom tapered-thrust
(Continued)

bearings, and a lower seal carrier attached to a bottom side of the seal and bearing housing having a plurality of removable seal carrier trays.

14 Claims, 32 Drawing Sheets

Related U.S. Application Data continuation of application No. PCT/US2019/030042, filed on Apr. 30, 2019.

(60) Provisional application No. 62/665,885, filed on May 2, 2018.

(51) Int. Cl.
  *F16J 15/02* (2006.01)
  *F16J 15/06* (2006.01)
  *E21B 3/02* (2006.01)

(56) References Cited

U.S. PATENT DOCUMENTS

| | | | |
|---|---|---|---|
| 8,844,652 B2 | 9/2014 | Sokol et al. | |
| 9,267,350 B1* | 2/2016 | Pruitt | E21B 33/085 |
| 10,995,573 B2 | 5/2021 | Fraczek | |
| 11,008,825 B2* | 5/2021 | Fraczek | E21B 33/085 |
| 2001/0047885 A1 | 12/2001 | Calder | |
| 2002/0070014 A1 | 6/2002 | Kinder | |
| 2005/0236835 A1* | 10/2005 | Williams | F16B 21/04 |
| | | | 285/361 |
| 2009/0057021 A1* | 3/2009 | Williams | E21B 33/085 |
| | | | 175/195 |
| 2009/0057024 A1 | 3/2009 | Williams | |
| 2013/0032359 A1* | 2/2013 | Riggs | E21B 33/085 |
| | | | 166/378 |
| 2016/0305213 A1 | 10/2016 | Godfrey et al. | |
| 2017/0051785 A1 | 2/2017 | Cooper | |
| 2017/0167221 A1* | 6/2017 | Reinhardt | F16J 15/441 |
| 2021/0123316 A1* | 4/2021 | Orbell | E21B 21/08 |

OTHER PUBLICATIONS

Applicant reply to Office Action dated Sep. 22, 2020, in U.S. Appl. No. 16/984,874, filed Aug. 4, 2020, reply submitted on Dec. 21, 2020.

Applicant reply to Restriction Requirement dated Oct. 9, 2020, in U.S. Appl. No. 16/984,831, filed Aug. 4, 2020, reply submitted on Dec. 7, 2020.

PCT international search report of international search authority (USPTO) in PCT international application PCT/US2019/030016, filed Apr. 30, 2019, dated Aug. 9, 2019.

PCT international search report of international search authority (USPTO) in PCT international application PCT/US2019/030042, filed Apr. 30, 2019, dated Jul. 17, 2019.

PCT written opinion of international search authority (USPTO) in PCT international application PCT/US2019/030016, filed Apr. 30, 2019, dated Aug. 9, 2019.

PCT written opinion of international search authority (USPTO) in PCT international application PCT/US2019/030042, filed Apr. 30, 2019, dated Jul. 17, 2019.

USPTO non-final office action issued in U.S. Appl. No. 16/984,831, filed Aug. 4, 2020, dated Dec. 23, 2020.

USPTO non-final office action issued in U.S. Pat. App. Ser. No. 2009/0057024, dated Sep. 22, 2020.

USPTO notice of allowance issued in U.S. Appl. No. 16/984,831, filed Aug. 4, 2020, dated Feb. 3, 2021.

USPTO notice of allowance issued in U.S. Appl. No. 16/984,874, filed Aug. 4, 2020, dated Jan. 3, 2021.

USPTO restriction requirement issued in U.S. Appl. No. 16/984,831, filed Aug. 4, 2020, dated Oct. 9, 2020.

USPTO notice of allowance issued in U.S. Appl. No. 17/241,711, filed Apr. 27, 2021, dated Oct. 6, 2021.

* cited by examiner

ROTATING CONTROL DEVICE FOR LAND RIGS

CROSS-REFERENCE TO RELATED APPLICATIONS

This application is a continuation of U.S. patent application Ser. No. 16/984,874, filed on Aug. 4, 2020, which is a continuation of PCT International Application PCT/US2019/030042, filed on Apr. 30, 2019, which claims the benefit of, or priority to, U.S. Provisional Patent Application Ser. No. 62/665,885, filed on May 2, 2018, all of which are hereby incorporated by reference in their entirety for all purposes.

BACKGROUND OF THE INVENTION

In conventional drilling operations, a wellhead disposed over a wellbore includes an annular blowout preventer that is fluidly connected to a rotating control device that, with other pressure control equipment, are used to manage wellbore pressure. The drill string extends through an interior passageway of the rotating control device and the annular blowout preventer and extends into the wellbore, which may extend several thousands of feet below the Earth's surface.

In applications where wellbore pressure is managed, including, for example, managed pressure drilling, pressurized mud cap drilling, underbalanced drilling, extended reach wells, and other drilling operations, the annulus surrounding the drill string is sealed by the rotating control device and the wellbore pressure is managed through manipulation of a surface-backpressure choke manifold disposed on the rig floor. Specifically, wellbore pressure is managed by controlling the choke aperture of the surface-backpressure choke manifold fed by one or more fluid flow lines that divert returning fluids to the surface. Each choke valve of the surface-backpressure choke manifold is capable of a fully opened state where flow is unimpeded, a fully closed state where flow is stopped, and intermediate states where the valve is partially opened, thereby restricting flow and applying surface backpressure commensurate with the flow restriction. If the driller wishes to increase annular pressure, the choke aperture may be closed to the extent necessary to increase the annular pressure the desired amount. Similarly, if the driller wishes to reduce annular pressure, the choke aperture may be opened to the extent necessary to decrease the annular pressure the desired amount. In this way, wellbore pressure may be managed by controlling the surface backpressure from the platform of the drilling rig.

BRIEF SUMMARY OF THE INVENTION

According to one aspect of one or more embodiments of the present invention, a circulating lubricant seal and bearing assembly including a seal and bearing housing, a rotatable mandrel disposed within an inner aperture of the seal and bearing housing, an upper seal carrier attached to a top side of the seal and bearing housing including a dynamic sealing element that contacts the rotatable mandrel, a plurality of tapered-thrust bearings to facilitate rotation of the rotatable mandrel, where the plurality of tapered-thrust bearings include top tapered-thrust bearings indirectly mounted at a positive offset angle from a perpendicular line to a longitudinal axis of the rotating control device and bottom tapered-thrust bearings indirectly mounted at a negative offset angle from the perpendicular line to the longitudinal axis of the rotating control device, a preload spacer disposed between the top and bottom tapered-thrust bearings, and a lower seal carrier attached to a bottom side of the seal and bearing housing including a plurality of removable seal carrier trays, where a plurality of dynamic sealing elements that contact the rotatable mandrel are removably disposed within the plurality of removable seal carrier trays.

According to one aspect of one or more embodiments of the present invention, a sealed seal and bearing assembly including a seal and bearing housing, a rotatable mandrel disposed within an inner aperture of the seal and bearing housing, an upper seal carrier attached to a top side of the seal and bearing housing including a dynamic sealing element that contacts the rotatable mandrel, a plurality of tapered-thrust bearings to facilitate rotation of the rotatable mandrel, where the plurality of tapered-thrust bearings include top tapered-thrust bearings indirectly mounted at a positive offset angle from a perpendicular line to a longitudinal axis of the rotating control device and bottom tapered-thrust bearings indirectly mounted at a negative offset angle from the perpendicular line to the longitudinal axis of the rotating control device, a preload spacer disposed between the top and bottom tapered-thrust bearings, and a lower seal carrier attached to a bottom side of the seal and bearing housing including a plurality of removable seal carrier trays, where a plurality of dynamic sealing elements that contact the rotatable mandrel are removably disposed within the plurality of removable seal carrier trays.

According to one aspect of one or more embodiments of the present invention, a rotating control device includes a bowl housing having an inner aperture to receive a removably disposed seal and bearing assembly and a seal and bearing assembly. The seal and bearing assembly includes a seal and bearing housing, a rotatable mandrel disposed within an inner aperture of the seal and bearing housing, an upper seal carrier attached to a top side of the seal and bearing housing including a dynamic sealing element that contacts the rotatable mandrel, a plurality of tapered-thrust bearings to facilitate rotation of the rotatable mandrel, where the plurality of tapered-thrust bearings include top tapered-thrust bearings indirectly mounted at a positive offset angle from a perpendicular line to a longitudinal axis of the rotating control device and bottom tapered-thrust bearings indirectly mounted at a negative offset angle from the perpendicular line to the longitudinal axis of the rotating control device, a preload spacer disposed between the top and bottom tapered-thrust bearings, and a lower seal carrier attached to a bottom side of the seal and bearing housing including a plurality of removable seal carrier trays, where a plurality of dynamic sealing elements that contact the rotatable mandrel are removably disposed within the plurality of removable seal carrier trays.

Other aspects of the present invention will be apparent from the following description and claims.

DETAILED DESCRIPTION OF THE INVENTION

Figure 1:
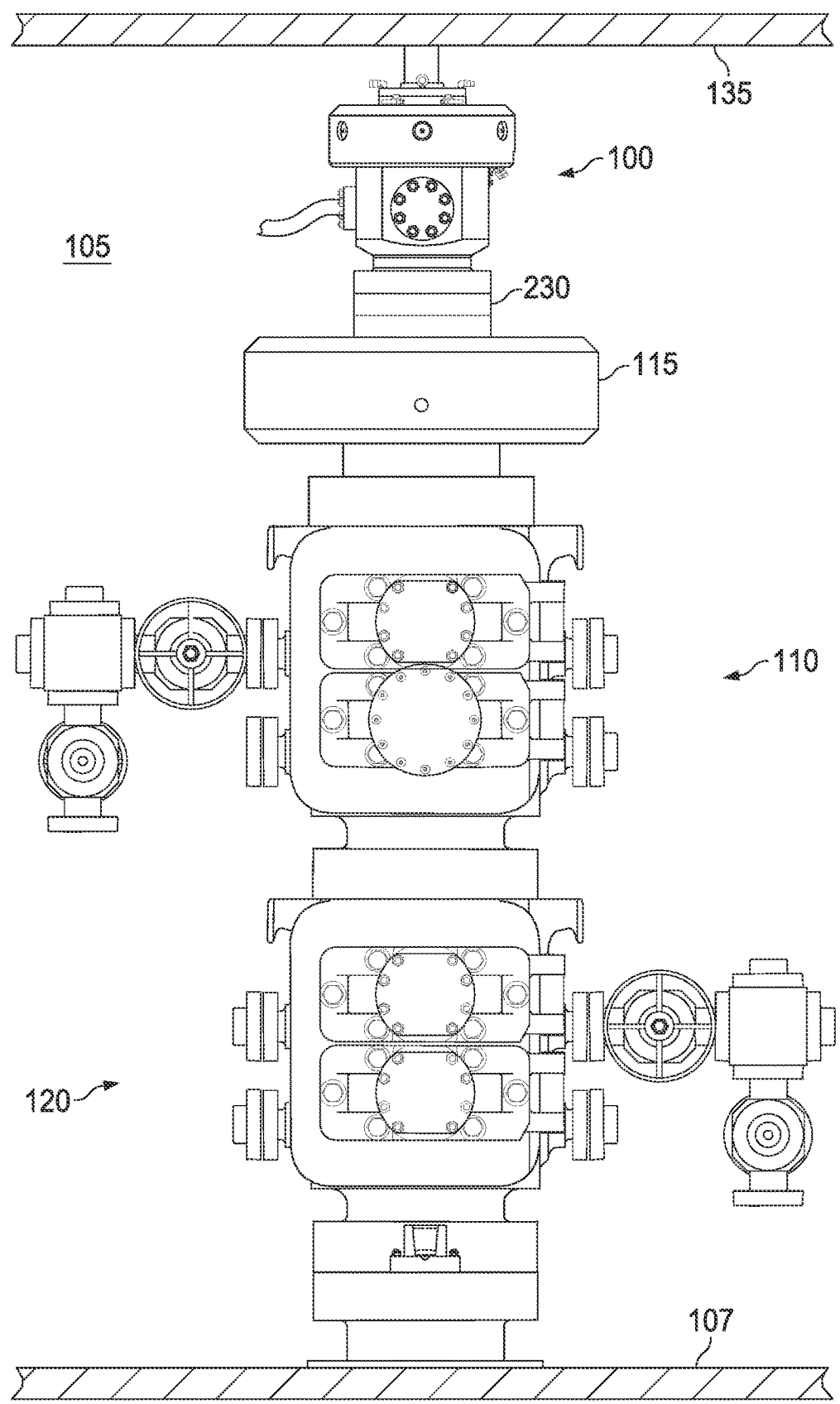
FIG. 1 shows a wellhead for a land rig that includes an improved rotating control device in accordance with one or more embodiments of the present invention.

One or more embodiments of the present invention are described in detail with reference to the accompanying figures. For consistency, like elements in the various figures are denoted by like reference numerals. In the following detailed description of the present invention, specific details are set forth in order to provide a thorough understanding of the present invention. In other instances, well-known features to one of ordinary skill in the art are not described to avoid obscuring the description of the present invention.

In applications where wellbore pressure is managed, an annular closing, or pressure containment, device is used to seal the annulus surrounding the drill string. Pressure containment devices include rotating control devices, non-rotating control devices, and other annular closing devices. Rotating control devices typically include one or more sealing elements that rotate with the drill string, whereas non-rotating control devices typically include one or more sealing elements that do not rotate with the drill string. The one or more sealing elements are either active or passive. Active sealing elements typically use active seals such as, for example, hydraulically actuated sealing elements, whereas passive sealing elements typically use passive seals. Rotating control devices using passive sealing elements are the most commonly used type of pressure containment device in use today due to their comparatively lower upfront costs and proven track record.

However, conventional rotating control devices suffer from a number of issues that complicate their use, reduce productive uptime, and increase the total cost of ownership. Conventional rotating control devices include one or more sealing elements that perform the sealing function and one or more bearing assemblies that facilitate rotation of the sealing elements with the drill string. The bearing assemblies are prone to failure due to, for example, mechanical wear out, lack of lubrication, reciprocation on the drill pipe, and the like, requiring their removal and replacement, resulting in expensive non-productive downtime. In some circumstances, the drill string must be tripped out to remove and replace the bearing assembly of the rotating control device at substantial expense. As such, a significant contributor to the total cost of ownership of conventional rotating control devices is the cost associated with installing, monitoring, servicing, removing, and replacing the bearing assembly and the related non-productive downtime. In addition, conventional rotating control devices typically use mechanical clamping mechanisms to secure the seal and bearing assembly to a housing. The clamping mechanisms are prone to mechanical wear out and damage from rig operations and reciprocation of the drill string and, when they fail, control of wellbore pressure is lost posing a significant danger to the safety of rig personnel and increasing the risk of fouling the environment, and the rotating control device itself must be pulled and replaced.

Accordingly, in one or more embodiments of the present invention, an improved rotating control device for land rigs has a simplified design that includes fewer parts, costs less to manufacture, and reduces upfront costs as well as total cost of ownership. The improved rotating control device includes a plurality of clamp-less, hydraulically-actuated, and fail-last-position latching assemblies that controllably extend a plurality of piston-driven dogs radially into a groove of a seal and bearing assembly. Advantageously, the seal and bearing assembly can be more easily and quickly installed, removed, and replaced with a substantial reduction in the non-productive time typically associated with such tasks. If hydraulic power is lost, the latching assemblies fail in their last position, ensuring that the seal and bearing assembly remains stable within the rotating control device. In addition, the seal and bearing assembly includes a plurality of indirectly mounted tapered-thrust bearings that increase radial stability that reduces or eliminates wear out caused by reciprocation of the drill string, thereby extending the productive life of the seal and bearing assembly. Advantageously, a unique seal carrier design provides highly accurate bearing preload that further extends the productive life of the seal and bearing assembly without the use of springs or shims. The unique seal carrier design includes discrete and removable seal carrier trays that facilitate the efficient removal and replacement of seals without damaging the seal carrier housing. Other advantageous aspects of one or more embodiments of the present invention will be readily apparent to one of ordinary skill in the art based on the following disclosure.

FIG. 1 shows a wellhead system 105 for a land rig (not independently illustrated) that includes an improved rotating control device 100 in accordance with one or more embodiments of the present invention. A wellhead structure 120 may be disposed over a wellbore (not independently illustrated) that is drilled into the Earth's surface 107. Wellhead 120 may fluidly communicate with a blowout preventer 110 that may fluidly communicate with an annular 115. Annular 115 may fluidly communicate with rotating control device 100. Specifically, a bottom flange 230 of rotating control device 100 may connect, directly or indirectly, to annular 115 disposed below rotating control device 100.

A drill string (not shown) may be disposed through a common lumen that extends from platform 135 through rotating control device 100, annular 115, blowout preventer 110, wellhead 120, and into the wellbore (not independently illustrated). As used herein, lumen means an interior passageway of a tubular or structure that may vary in diameter along the passageway. Drilling fluids (not shown) may be pumped downhole through the interior passageway of the drill string (not shown). Rotating control device 100 may include at least one sealing element (not shown) that seals the annulus (not shown) that surrounds the drill pipe (not shown). A fluid flow line (not shown) may divert returning annular fluids from a fluid flow port of the rotating control device 100 to platform 135 for recycling and reuse. The annular pressure may be managed from the surface by manipulating a surface-backpressure choke manifold (not shown) disposed on the platform 135.

Figure 2A:
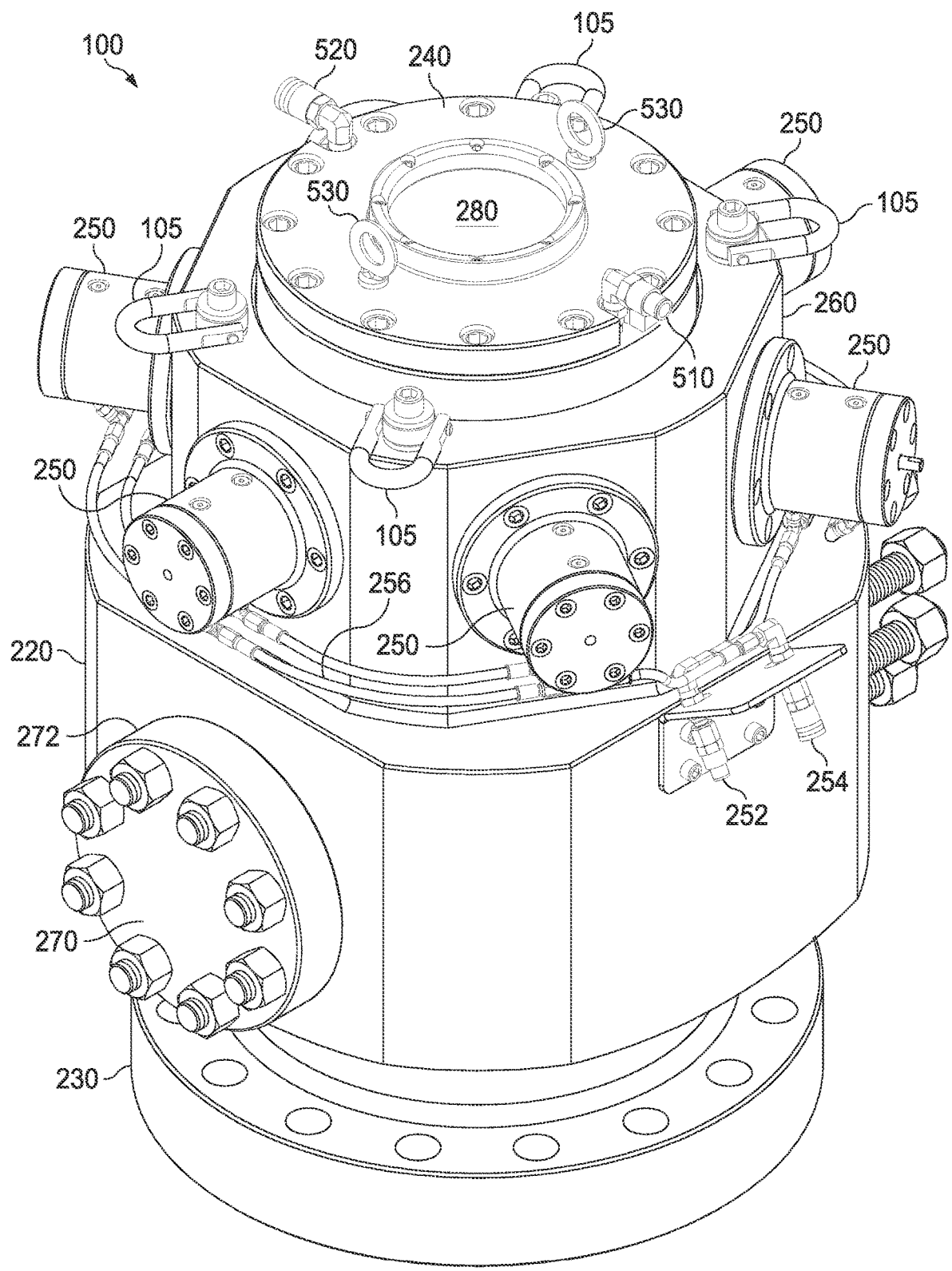
FIG. 2A shows a first perspective view of an improved rotating control device without shroud in accordance with one or more embodiments of the present invention.

FIG. 2A shows a first perspective view of an improved rotating control device 100 without a shroud in accordance with one or more embodiments of the present invention. Rotating control device 100 may include a bowl housing 220, a bottom flange 230, and a plurality of hydraulically-actuated fail-last-position latching assemblies 250.

Bowl housing 220 may include an inner aperture (not independently illustrated) to receive a removably disposed seal and bearing assembly (e.g., 500 of FIG. 5) and one or more fluid flow ports 270. A first interference-fit sealing element (not shown) may provide an interference-fit with a drill pipe (not shown) disposed therethrough and seal the cavity (not shown) surrounding the first interference-fit sealing element (not shown) where fluids may be directed to or from the one or more fluid flow ports 270. In one or more embodiments of the present invention, one or more of fluid flow ports 270 may be a flow diversion port, an injection port, or a surface-backpressure management port. One of ordinary skill in the art will recognize that the number, size, and configuration of fluid flow ports 270 may vary based on an application or design in accordance with one or more embodiments of the present invention. Bottom flange 230 may include a bottom flange lumen that extends centrally therethrough and may be attached to a bottom distal end of bowl housing 220. Bottom flange 230 may be used to connect rotating control device 100, directly or indirectly, to an annular (not shown) or blowout preventer (not shown) disposed below rotating control device 100.

A plurality of hydraulically-actuated fail-last-position latching assemblies 250 may be disposed about an outer surface of a recessed area 260 of bowl housing 220. The plurality of hydraulically-actuated fail-last-position latching assemblies 250 may be clamp-less and hydraulically powered to controllably extend a plurality of piston-driven dogs (not shown) radially into a groove (not shown) of seal and bearing assembly (e.g., 500 of FIG. 5). In this way, the latching assemblies 250 may be used to controllably secure seal and bearing assembly (e.g., 500 of FIG. 5) to bowl housing 220 in a manner that allows for the quick and easy installation, service, removal, and replacement of assembly (e.g., 500 of FIG. 5). Because of the design of the piston-driven dogs (not shown) of latching assemblies 250 and the mating groove (not shown) of seal and bearing housing 240, in the event hydraulic power is lost, latching assemblies 250 maintain their last position, thus they are said to fail in their last position, thereby improving the safety of rotating control device 100 and operations in progress. As such, hydraulic power is required to activate the piston-driven dog, but not to maintain its position. Hydraulic power is then required again to deactivate the piston-drive dog. In the embodiment depicted, six (6) hydraulically-actuated fail-last-position latching assemblies 250 are distributed about the outer surface of the recessed area 260 of bowl housing 220. One of ordinary skill in the art will recognize that the number of latching assemblies 250 required to controllably secure the seal and bearing assembly (e.g., 500 of FIG. 5), and their distribution about the outer surface, may vary based on an application or design in accordance with one or more embodiments of the present invention. Further, one of ordinary skill in the art will also recognize that the number of latching assemblies 250 required to controllably secure the seal and bearing assembly (e.g., 500 of FIG. 5) may vary with the dimensions of rotating control device 100, seal and bearing assembly (e.g., 500 of FIG. 5), the piston-driven dogs (not shown), and the mating groove (not shown) of seal and bearing housing 240 in accordance with one or more embodiments of the present invention. Seal and bearing assembly (e.g., 500 of FIG. 5) may be a sealed (e.g., 500A) or circulating lubricant (e.g., 500B) seal and bearing assembly. In the circulating lubricant bearing assembly depicted, lubricant injection line 520 and lubricant removal line 510 may be used to circulate a lubricant through the bearing portion (not shown) of seal and bearing assembly (e.g., 500 of FIG. 5).

Figure 2B:
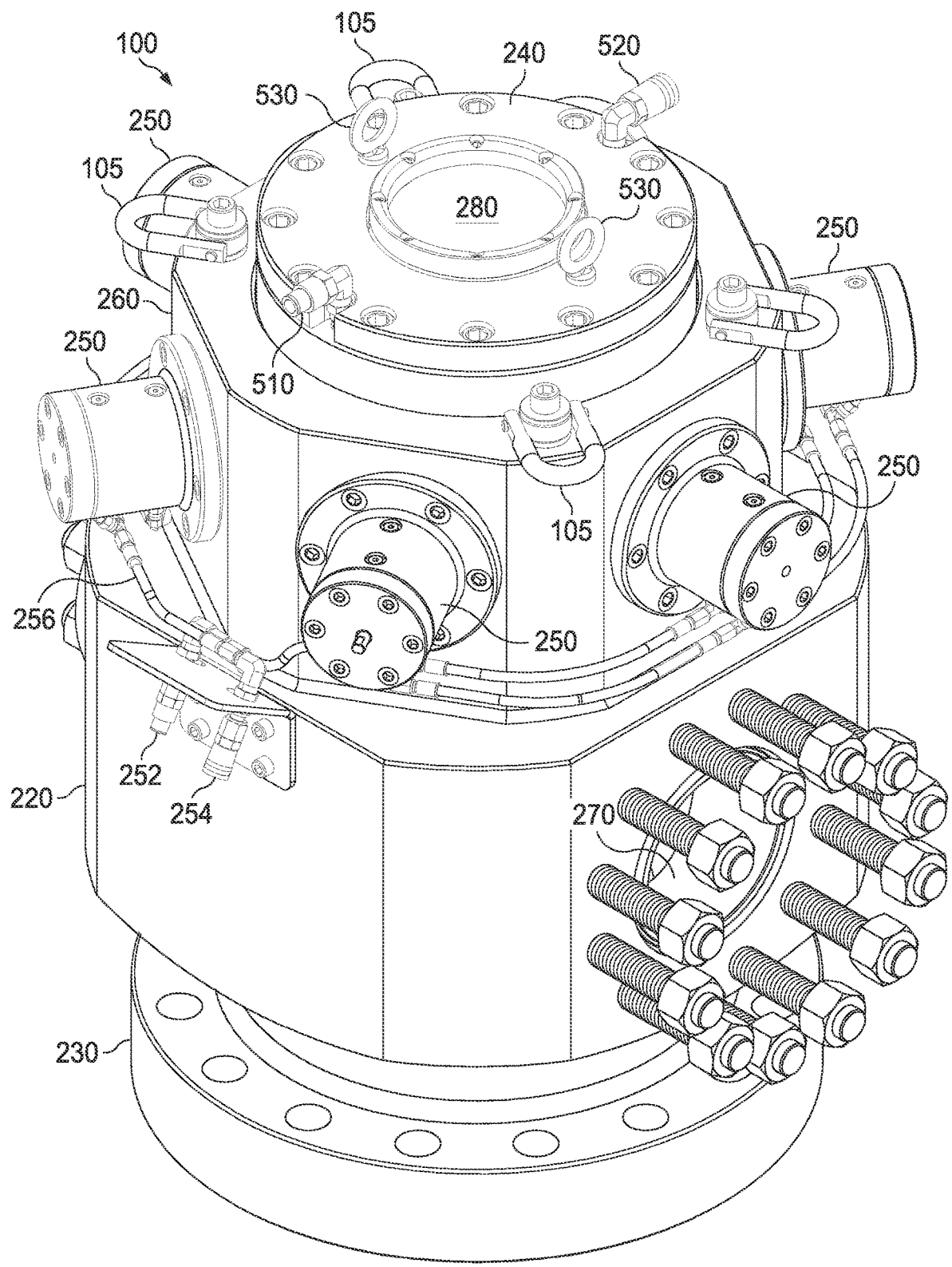
FIG. 2B shows a second perspective view of the improved rotating control device without shroud in accordance with one or more embodiments of the present invention.

Continuing, FIG. 2B shows a second perspective view of the improved rotating control device 100 without shroud in accordance with one or more embodiments of the present invention. Hydraulic ports 252 and 254 may be used to provide hydraulic power to the hydraulically-actuated fail-last-position latching assemblies 250. Hydraulic fluid may be driven in one of ports 252 or 254, daisy chained by hydraulic lines 256 to the latching assemblies 250 disposed about bowl housing 220, and removed from the other port 254 or 252. Hydraulic lines 256 may be used to daisy chain the hydraulic power to the latching assemblies 250.

Figure 2C:
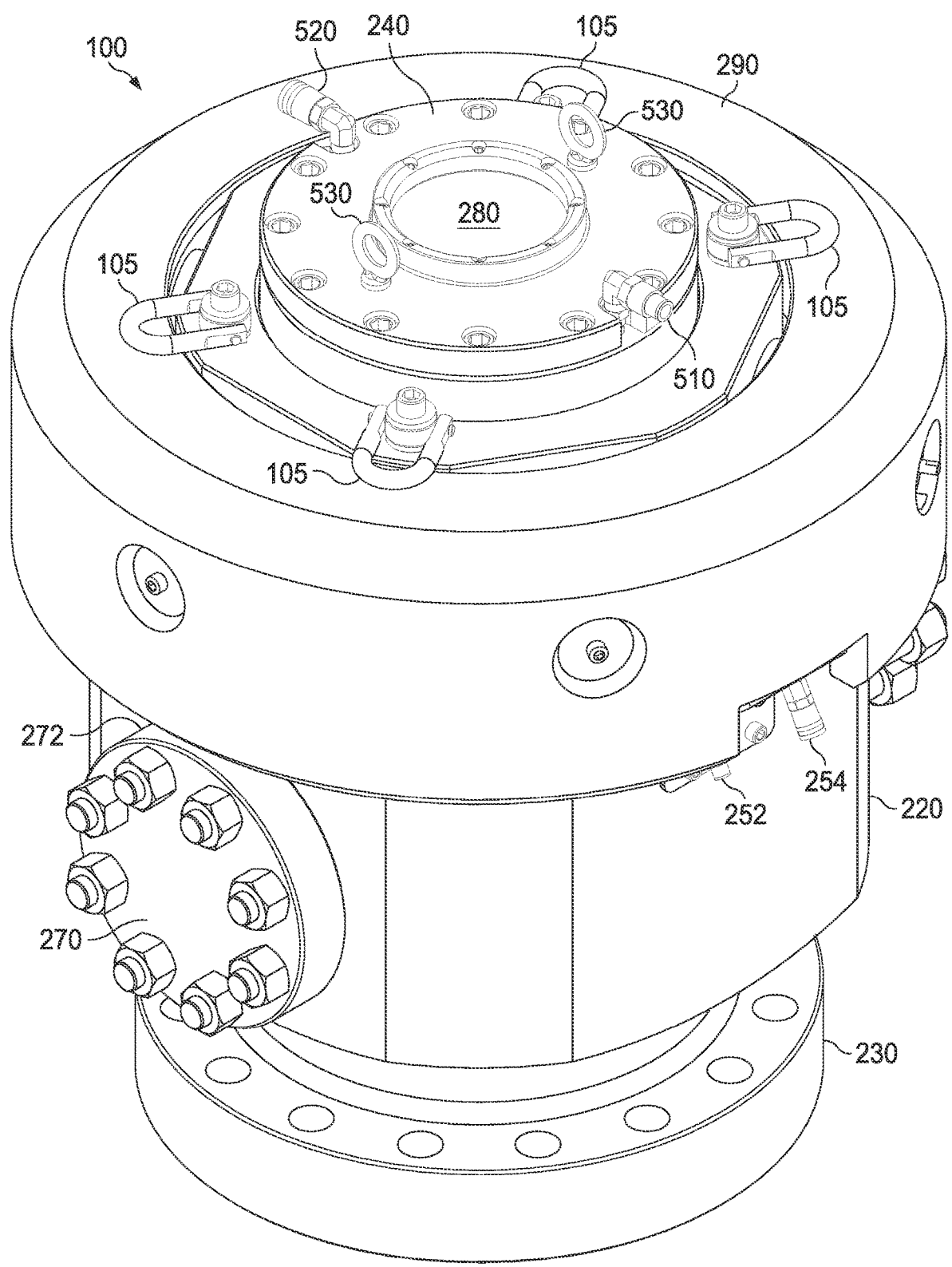
FIG. 2C shows the first perspective view of the improved rotating control device with shroud in accordance with one or more embodiments of the present invention.
Figure 2D:
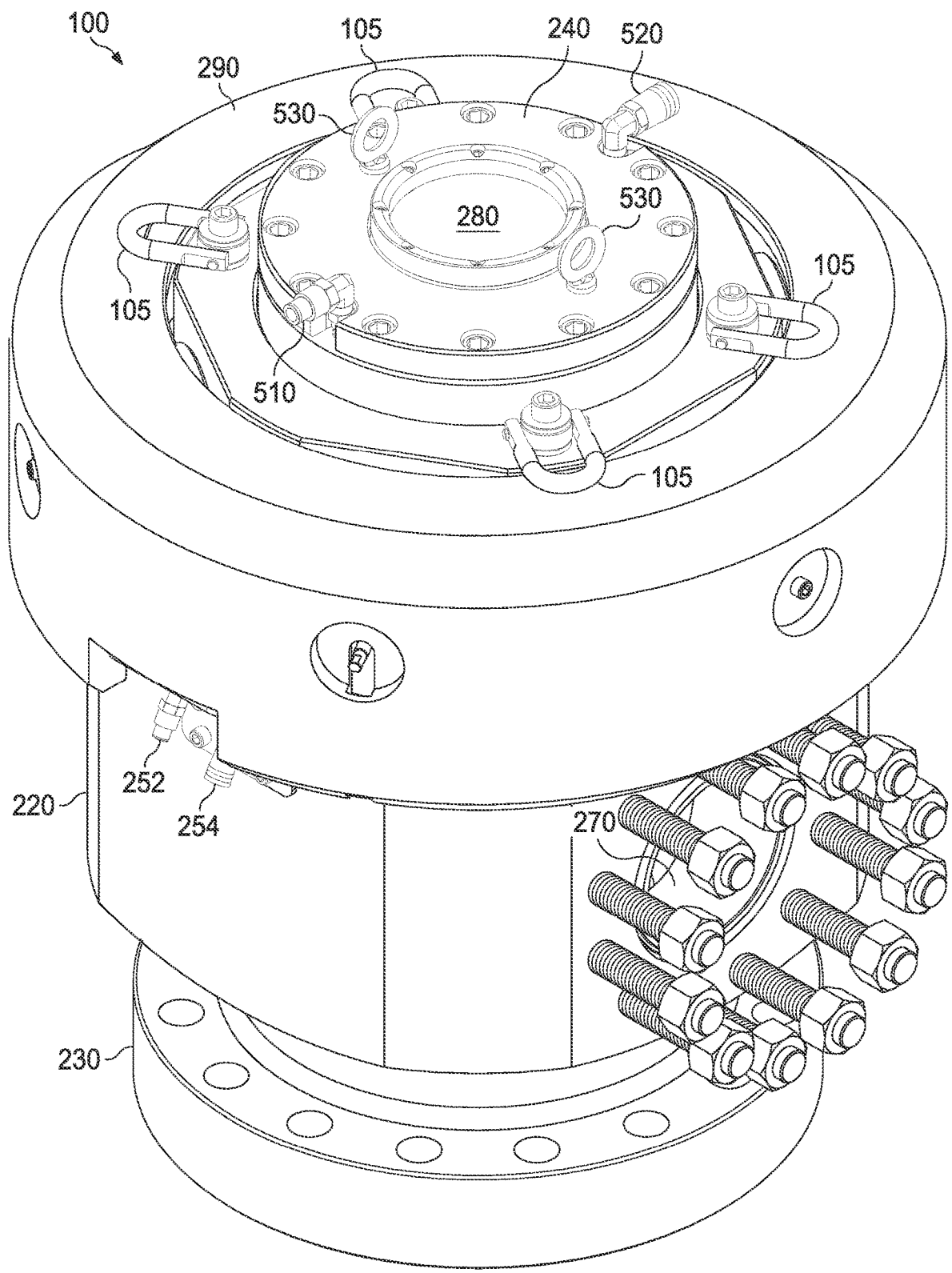
FIG. 2D shows the second perspective view of the improved rotating control device with shroud in accordance with one or more embodiments of the present invention.

Continuing, FIG. 2C shows the first perspective view of the improved rotating control device with shroud 290 in accordance with one or more embodiments of the present invention. A protective shroud 290 may be disposed around the plurality of hydraulically-actuated fail-last-position latching assemblies 250 that are distributed about the outer surface of the recessed area 260 of bowl housing 220. The shroud 290 may be protect the protruding portions of the hydraulically-actuated fail-last-position latching assemblies 250 during installation, operation, service, and removal. Continuing, FIG. 2D shows the second perspective view of the improved rotating control device 100 with shroud 290 in accordance with one or more embodiments of the present invention.

Figure 3A:
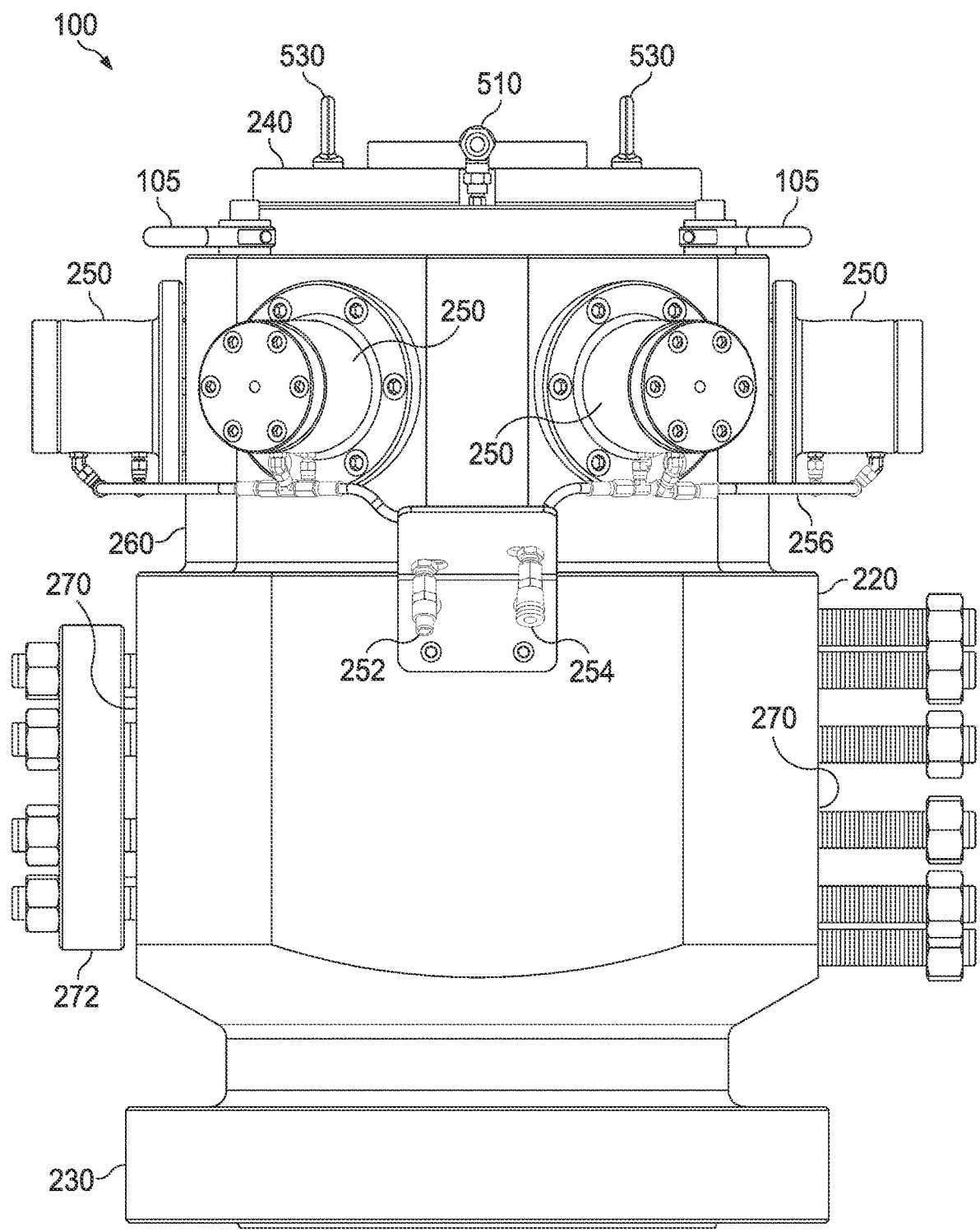
FIG. 3A shows a front elevation view of an improved rotating control device without shroud in accordance with one or more embodiments of the present invention.
Figure 3B:
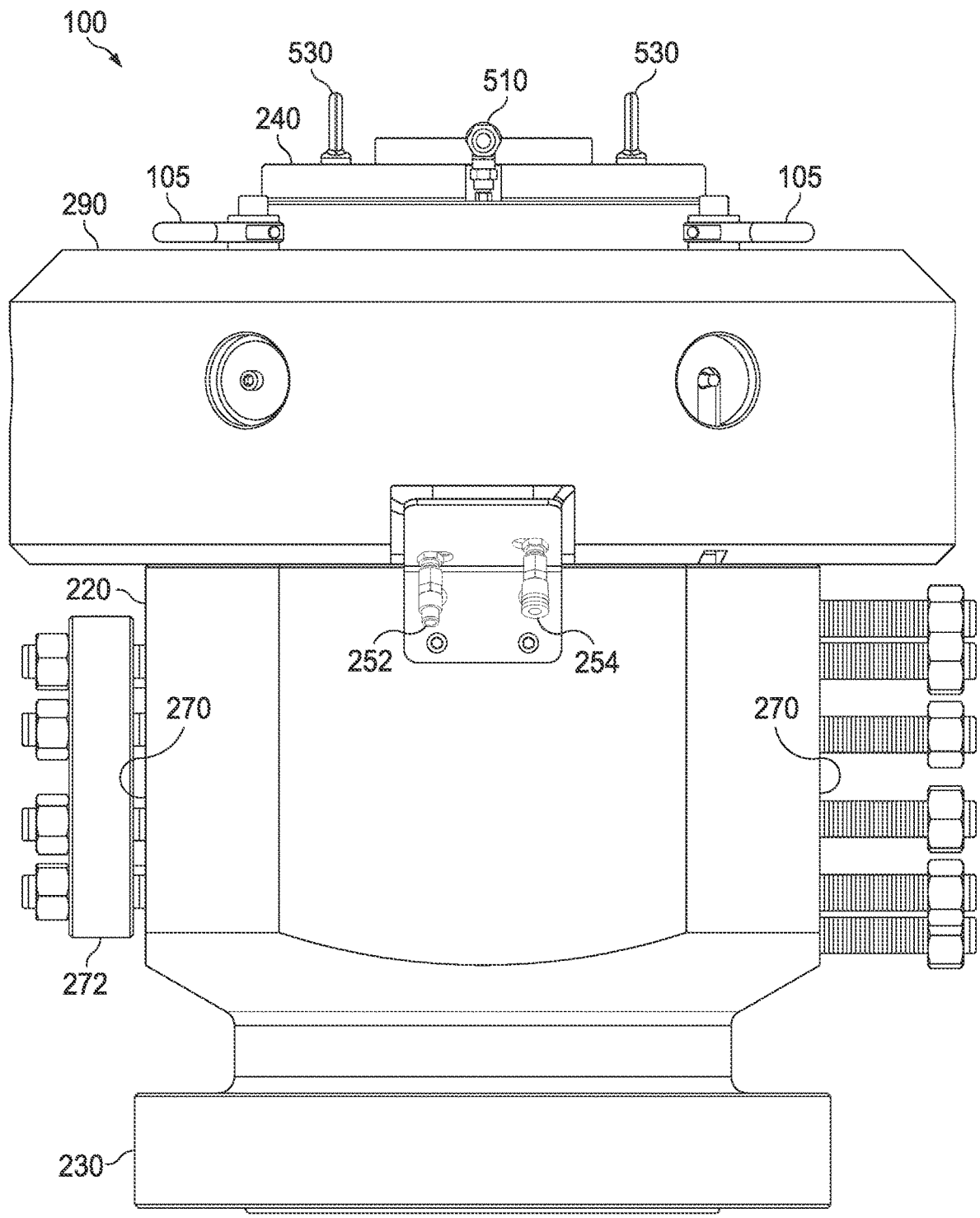
FIG. 3B shows a front elevation view of the improved rotating control device with shroud in accordance with one or more embodiments of the present invention.

FIG. 3A shows a front elevation view of an improved rotating control device 100 without shroud in accordance with one or more embodiments of the present invention. A plurality of hydraulically-actuated fail-last-position latching assemblies 250 may be disposed about an outer surface of a recessed portion 260 of bowl housing 220. Each latching assembly 250 may be oriented such that a piston-driven dog (not shown) may be radially deployed through an opening (not shown) of bowl housing 220 and into a mating groove (not shown) of seal and bearing housing 240 to controllably secure seal and bearing assembly 500 to bowl housing 220. Continuing, FIG. 3B shows a front elevation view of the improved rotating control device 100 with shroud 290 in accordance with one or more embodiments of the present invention. Shroud 290 may be protect the protruding portions of the hydraulically-actuated fail-last-position latching assemblies 250. Protective shroud 290 may include a cutout where one or more hydraulic ports 252 and 254 may be connected to a latching assembly 250. The remaining latching assemblies 250 may receive hydraulic power from a daisy-chain of hydraulic fluid lines (not shown) emanating from hydraulic ports 252 and 254.

Figure 3C:
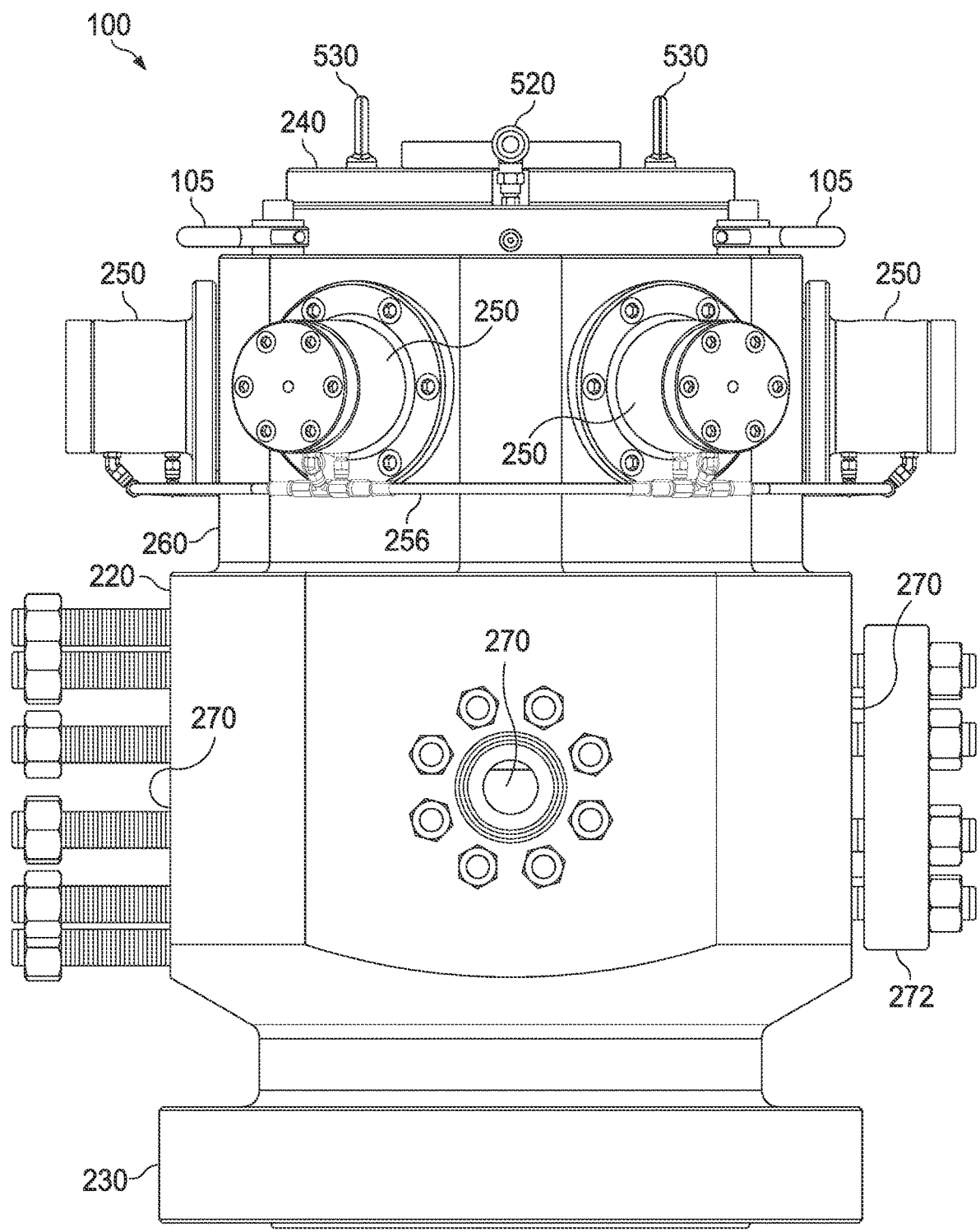
FIG. 3C shows a rear elevation view of the improved rotating control device without shroud in accordance with one or more embodiments of the present invention.
Figure 3D:
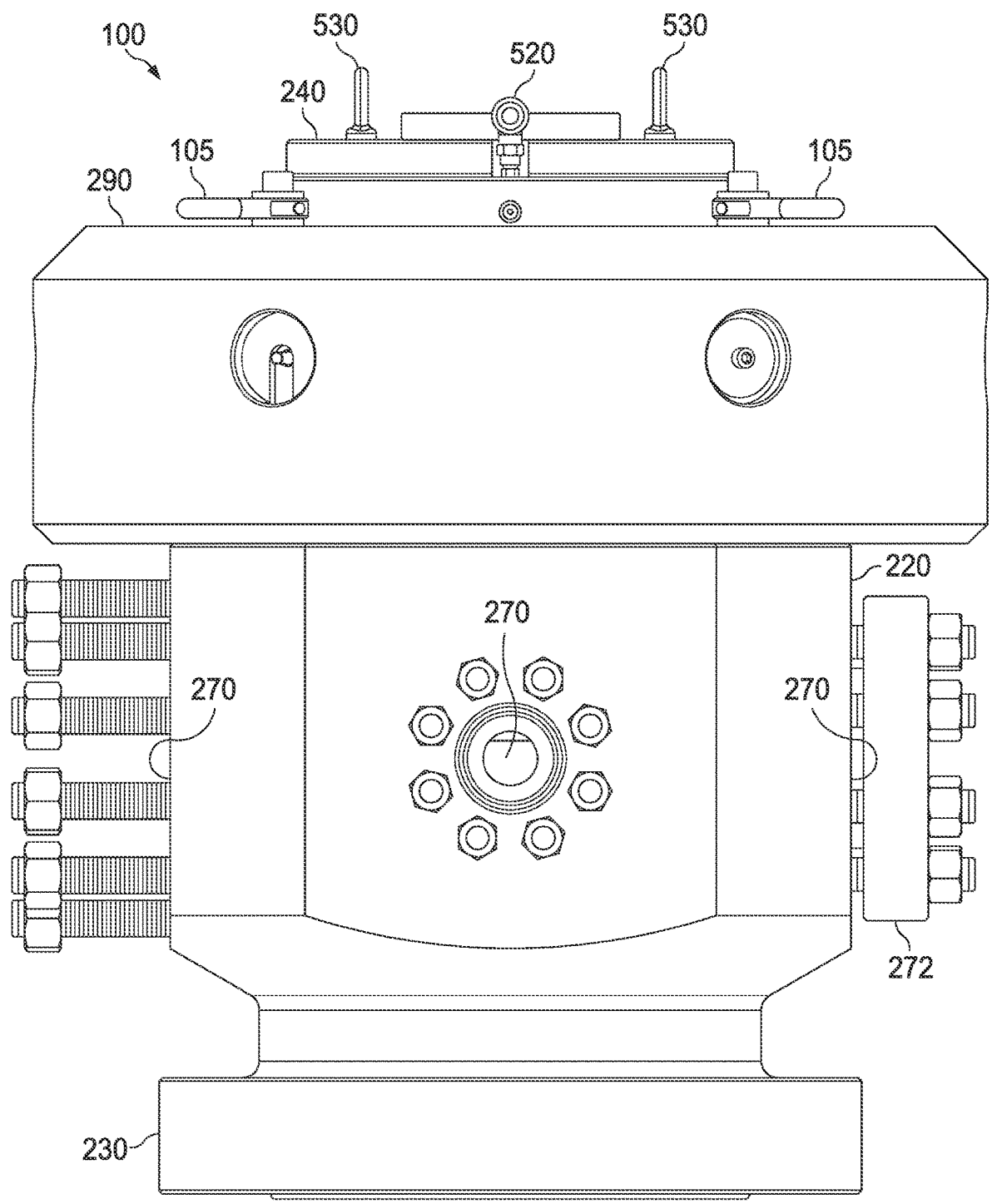
FIG. 3D shows a rear elevation view of the improved rotating control device with shroud in accordance with one or more embodiments of the present invention.

Continuing, FIG. 3C shows a rear elevation view of the improved rotating control device 100 without shroud in accordance with one or more embodiments of the present invention. The plurality of hydraulically-actuated fail-last-position latching assemblies 250 may include one or more hydraulic ports 252 and 254 that may be used to hydraulically deploy or retract their piston-driven dogs (not shown). The hydraulic fluid lines 256 may be daisy-chained such that the plurality of latching assemblies 250 deploy or retrain their piston-driven dogs (not shown) at substantially the same time. Continuing, FIG. 3D shows a rear elevation view of the improved rotating control device 100 with shroud 290 in accordance with one or more embodiments of the present invention.

Figure 3E:
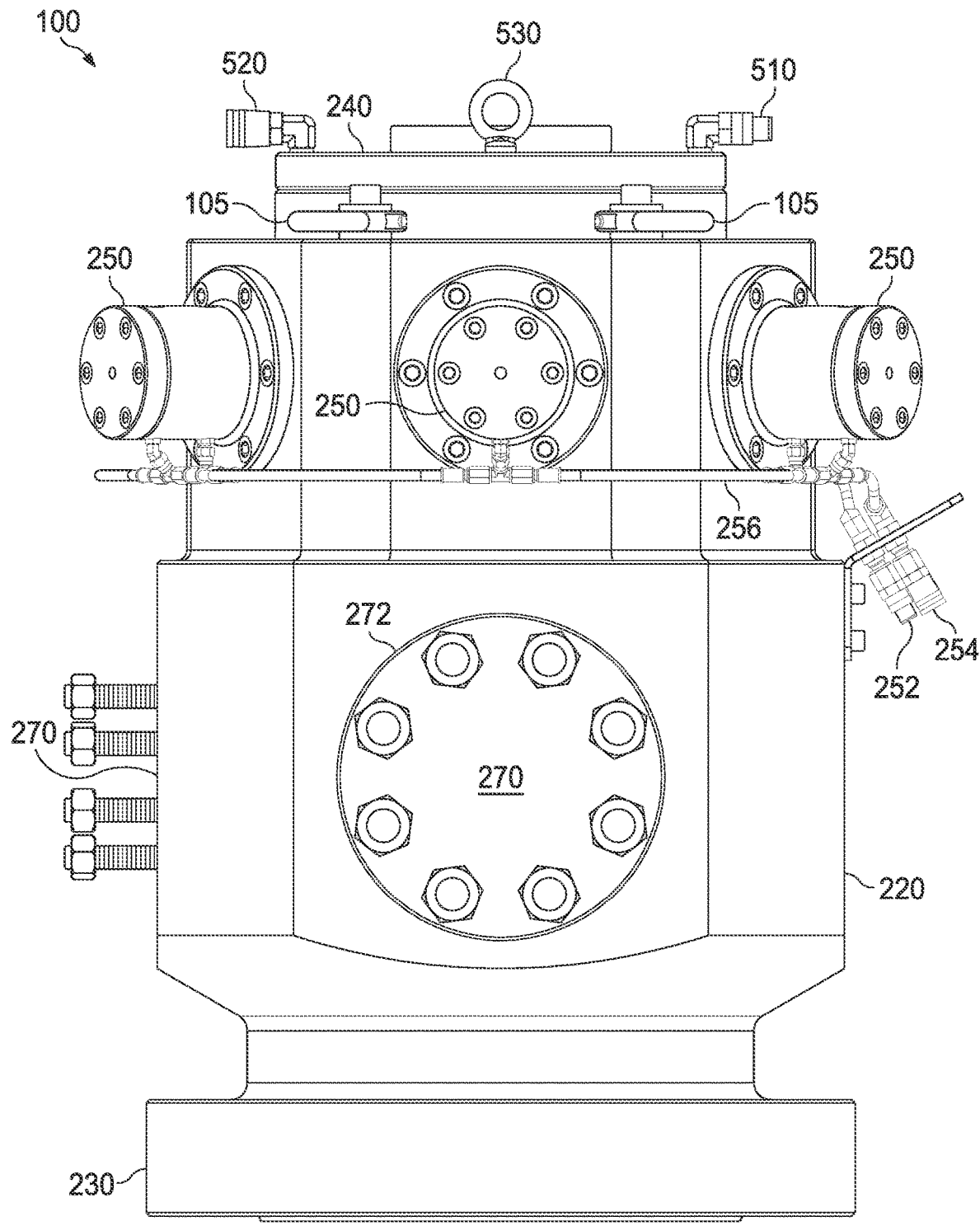
FIG. 3E shows a left-side elevation view of the improved rotating control device without shroud in accordance with one or more embodiments of the present invention.
Figure 3F:
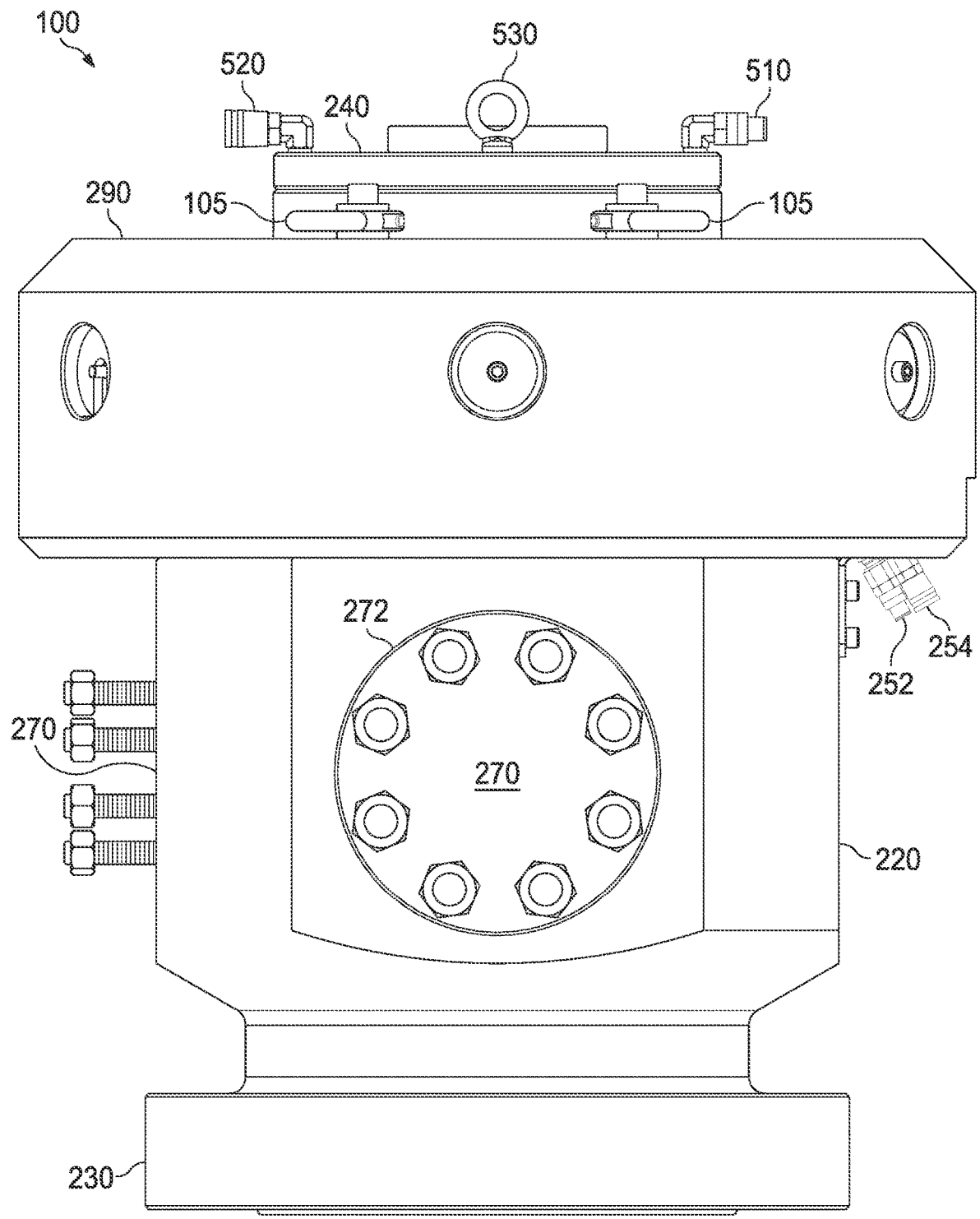
FIG. 3F shows a left-side elevation view of the improved rotating control device with shroud in accordance with one or more embodiments of the present invention.
Figure 3G:
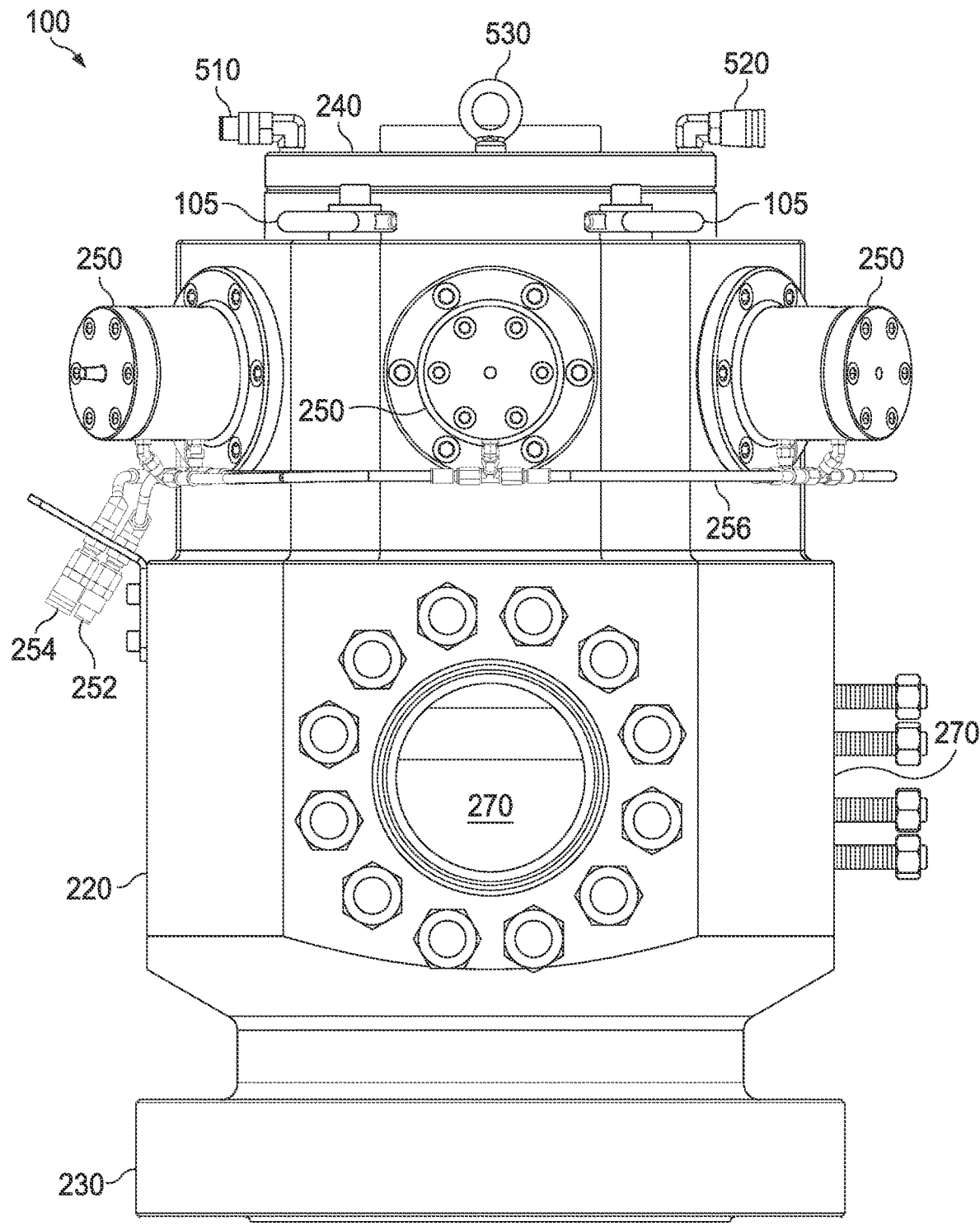
FIG. 3G shows a right-side elevation view of the improved rotating control device without shroud in accordance with one or more embodiments of the present invention.
Figure 3H:
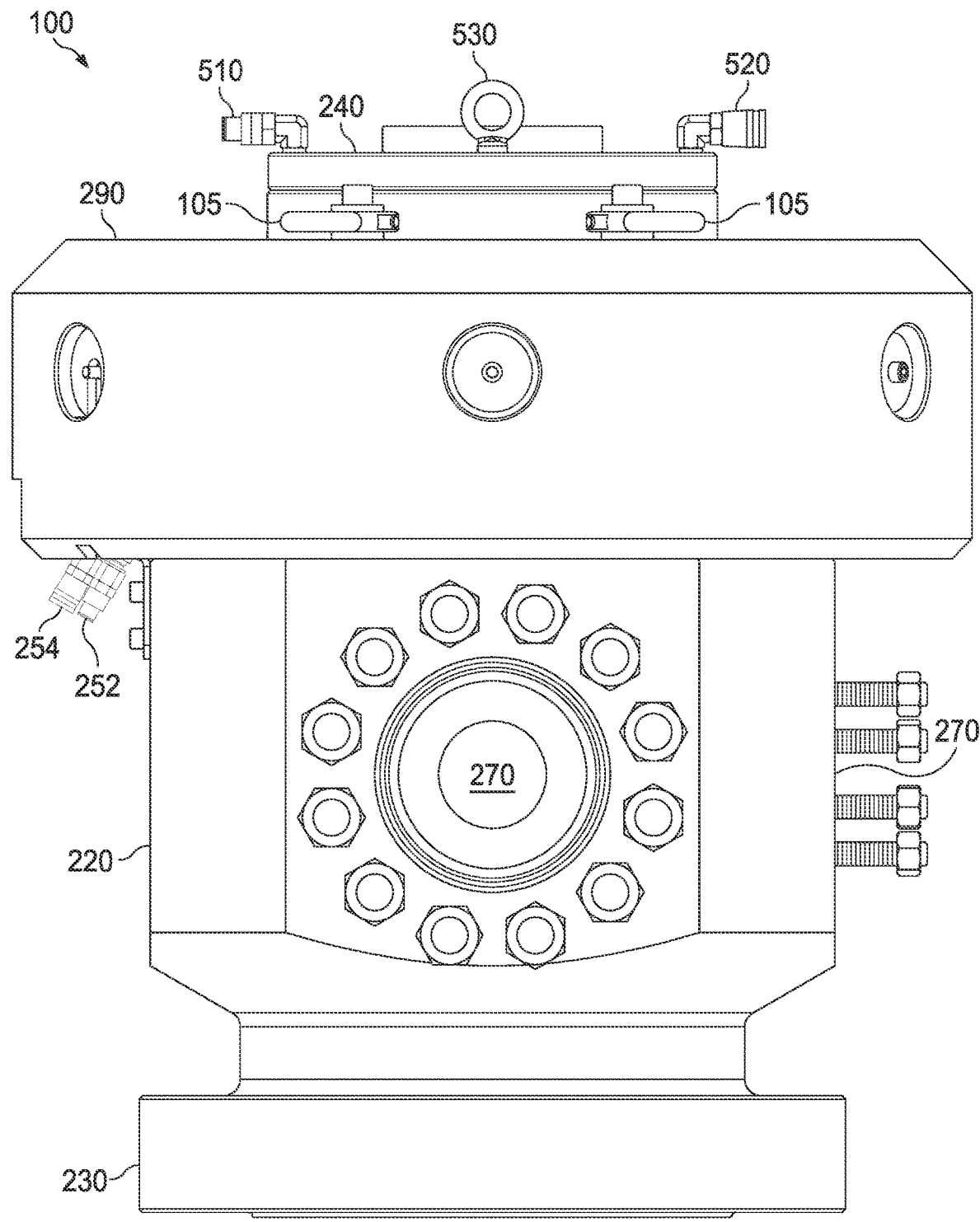
FIG. 3H shows a right-side elevation view of the improved rotating control device with shroud in accordance with one or more embodiments of the present invention.

Continuing, FIG. 3E shows a left-side elevation view of the improved rotating control device 100 without shroud in accordance with one or more embodiments of the present invention. Continuing, FIG. 3F shows a left-side elevation view of the improved rotating control device 100 with shroud 290 in accordance with one or more embodiments of the present invention. Continuing, FIG. 3G shows a right-side elevation view of the improved rotating control device 100 without shroud in accordance with one or more embodiments of the present invention. Continuing, FIG. 3H shows a right-side elevation view of the improved rotating control device 100 with shroud 290 in accordance with one or more embodiments of the present invention. One of ordinary skill in the art will recognize that the size, shape, and orientation of one or more fluid flow ports 270 may vary based on an application or design in accordance with one or more embodiments of the present invention.

Figure 4A:
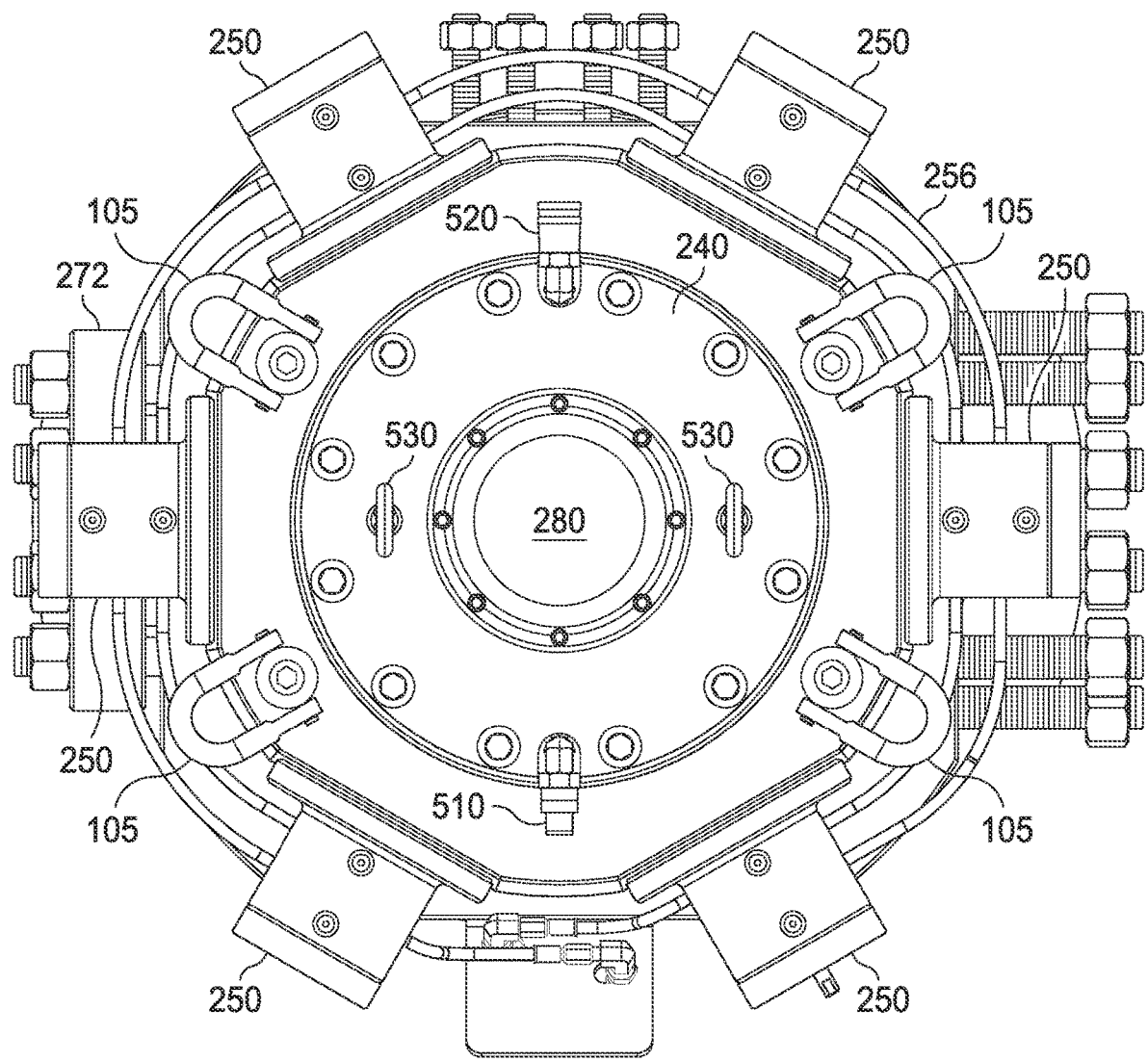
FIG. 4A shows a top plan view of an improved rotating control device without shroud in accordance with one or more embodiments of the present invention.

FIG. 4A shows a top plan view of an improved rotating control device 100 without shroud in accordance with one or more embodiments of the present invention. In the top plan view depicted, the distribution of the plurality of hydraulically-actuated fail-last-position latching assemblies 250 about an outer surface of bowl housing 220 is shown. As noted above, the number, size, and distribution of latching assemblies 250 may vary based on an application or design in accordance with one or more embodiments of the present invention. A plurality of hoisting connectors 105 may be distributed about a top portion of bowl housing 220 to facilitate movement of rotating control device 100. A common lumen 280 may extend from distal end to distal end of rotating control device 100.

Figure 4B:
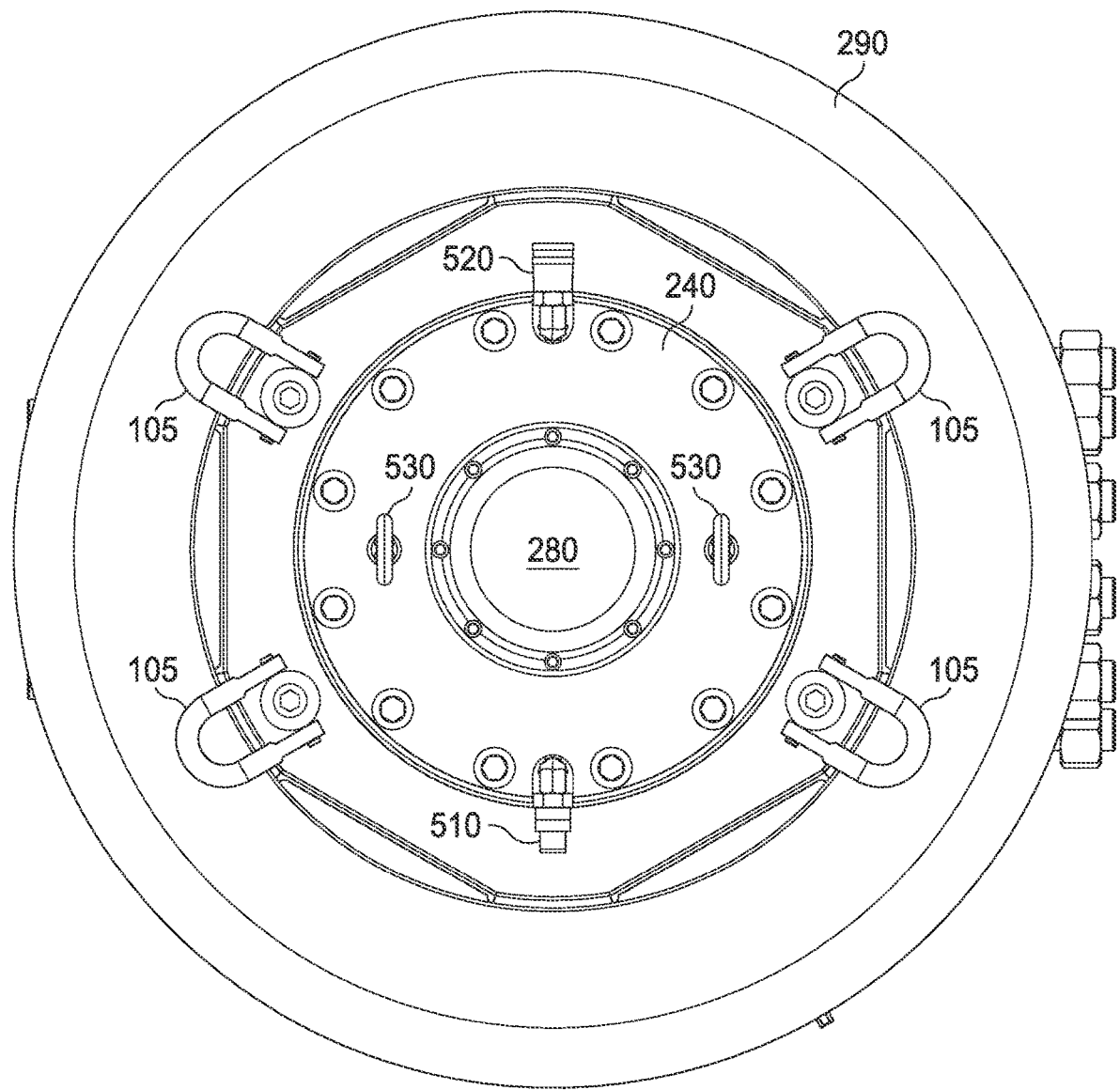
FIG. 4B shows a top plan view of the improved rotating control device with shroud in accordance with one or more embodiments of the present invention.
Figure 4C:
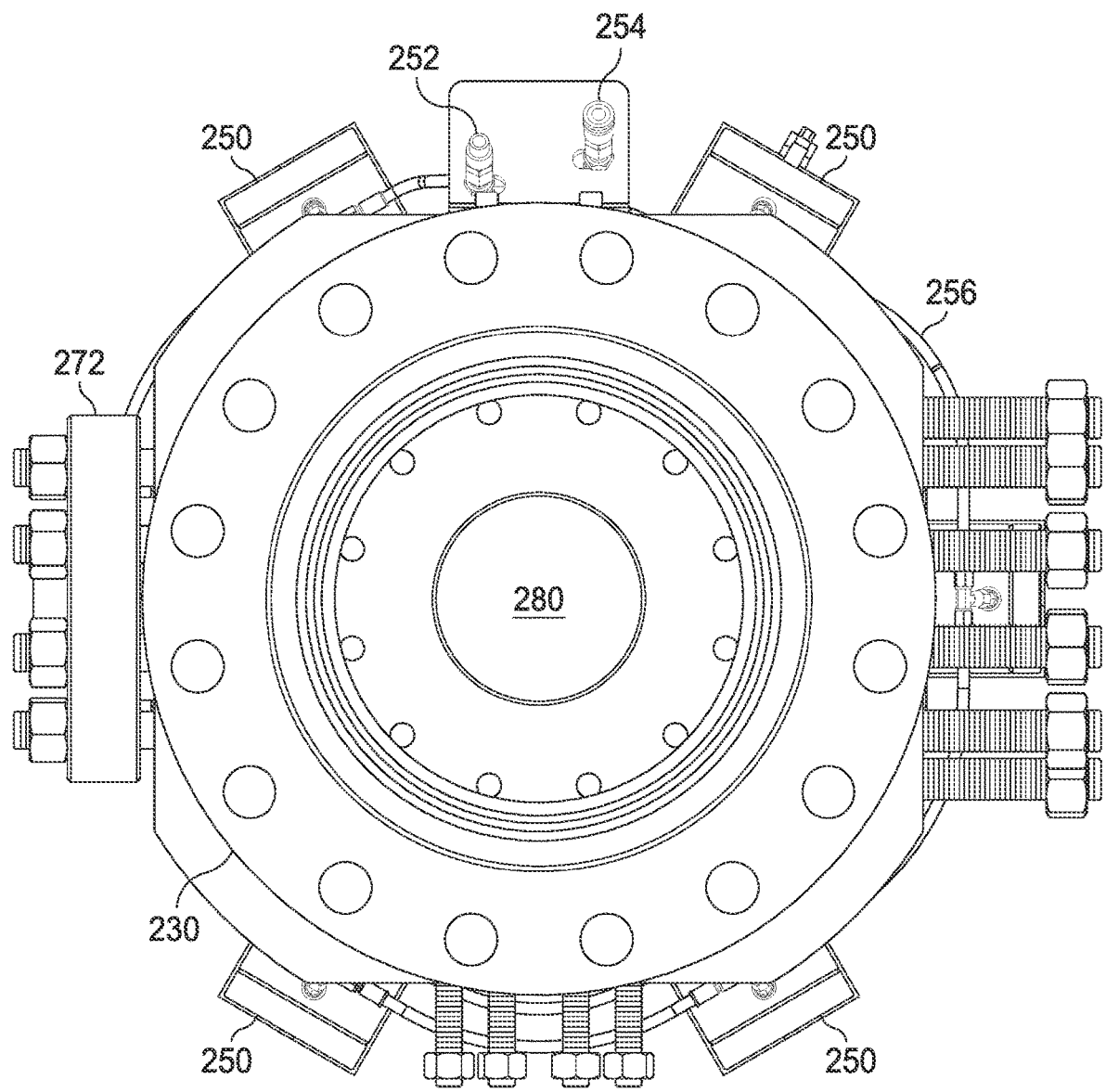
FIG. 4C shows a bottom plan view of the improved rotating control device without shroud in accordance with one or more embodiments of the present invention.
Figure 4D:
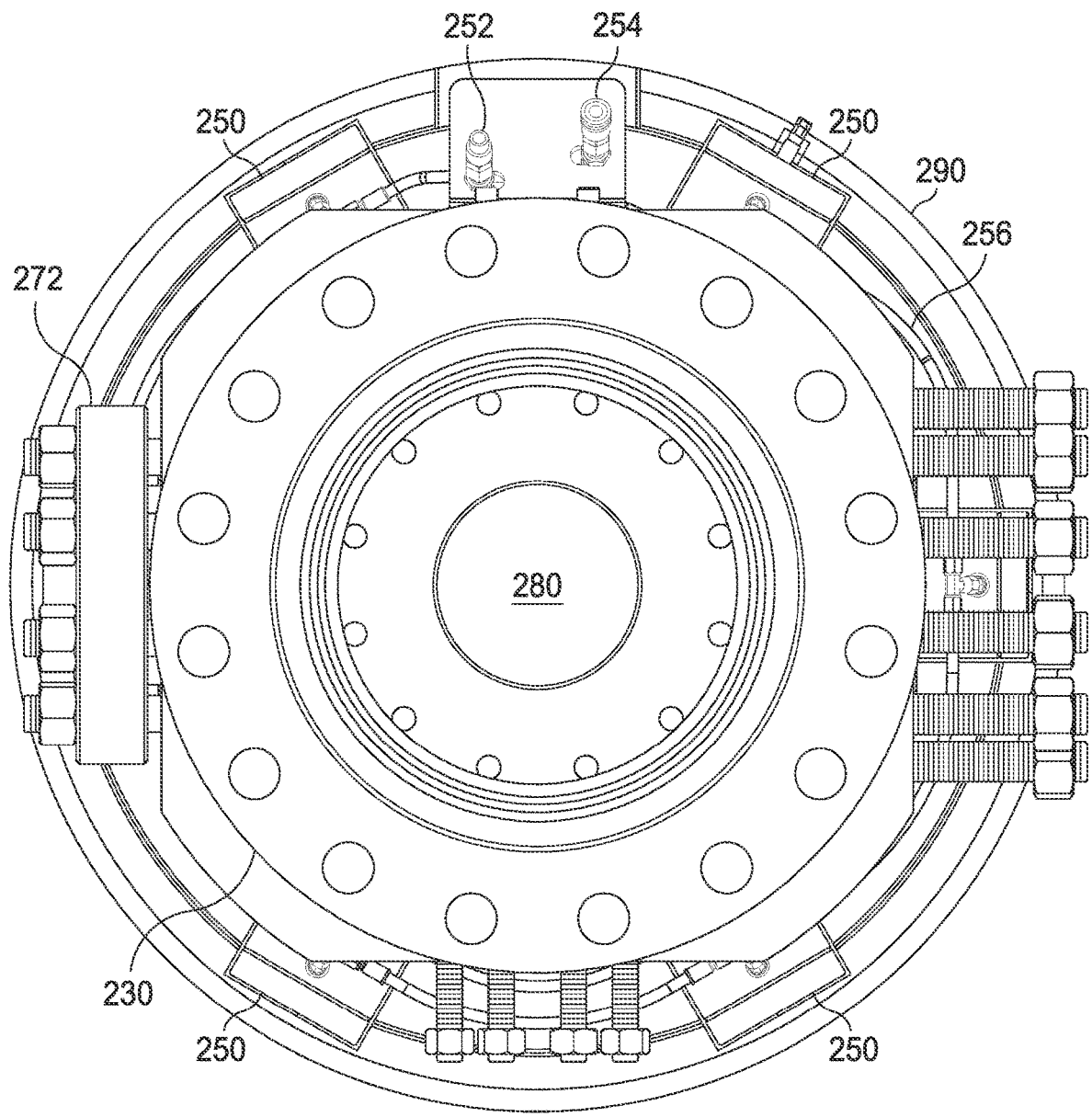
FIG. 4D shows a bottom plan view of the improved rotating control device with shroud in accordance with one or more embodiments of the present invention.

Continuing, FIG. 4B shows a top plan view of the improved rotating control device 100 with shroud 290 in accordance with one or more embodiments of the present invention. In addition to hoisting connectors 105, seal and bearing assembly 500 may include a plurality of shop hooks 530 that may be used to remove and replace seal and bearing assembly 500. Continuing, FIG. 4C shows a bottom plan view of the improved rotating control device 100 without shroud in accordance with one or more embodiments of the present invention. Continuing, FIG. 4D shows a bottom plan view of the improved rotating control device 100 with shroud 290 in accordance with one or more embodiments of the present invention. Common lumen 280 extends through seal and bearing assembly 500 and bottom flange 230 and may vary in diameter along the passageway. The drill pipe (not shown) may be removably disposed therethrough and the first interference-fit sealing element (not shown) may create an annular seal within rotating control device 100.

Figure 5A:
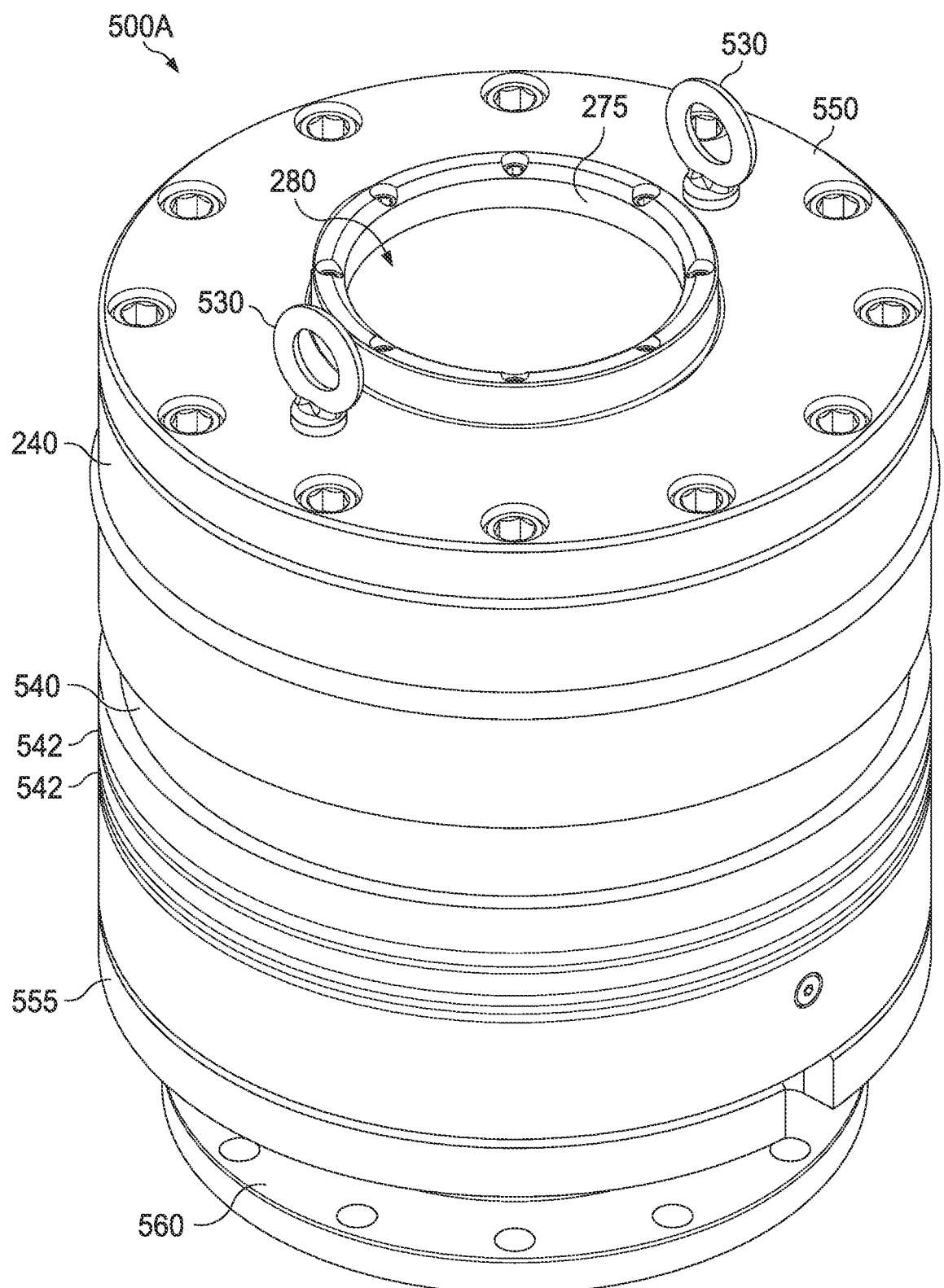
FIG. 5A shows a perspective view of a sealed seal and bearing assembly in accordance with one or more embodiments of the present invention.

FIG. 5A shows a perspective view of a sealed seal and bearing assembly 500A in accordance with one or more embodiments of the present invention. Sealed seal and bearing assembly 500A may include a seal and bearing housing 240, a mandrel (not independently illustrated) disposed within an inner aperture of seal and bearing housing 240, a first interference-fit sealing element (not shown) attached to a bottom distal end of the mandrel (not independently illustrated) to perform a sealing function, a plurality of tapered-thrust bearings (not shown) indirectly mounted to seal and bearing housing 240 to facilitate rotation of the mandrel (not independently illustrated) and the first interference-fit sealing element (not shown), a preload spacer (not shown) disposed between top and bottom tapered-thrust bearings (not shown), and a plurality of jam nuts (not shown) to adjust a preload of the tapered-thrust bearings (not shown). Seal and bearing assembly 500A may include a top plate 550, also referred to as an upper seal carrier, attached to the top side of seal and bearing housing 240. A lower seal carrier 555 may be attached to the bottom side of seal and bearing housing 240 and a seal adapter 560 may be attached to a bottom distal end of mandrel 275 for attachment of the first interference-fit sealing element (not shown). A substantially rectangular groove 540 may be disposed about an outer surface of seal and bearing housing 240 to receive a plurality of substantially rectangular piston-driven dogs (not shown) when actuated by the plurality of hydraulically-actuated fail-last-position latching assemblies (not shown). One or more static seals 542 may be disposed about an outer surface of seal and bearing housing 240 to provide a static and non-rotating seal between seal and bearing housing 240 and the bowl housing (e.g., 220). A plurality of shop hooks 530 may be included to facilitate insertion and removal of seal and bearing assembly 500A into and out of rotating control device 100.

Figure 5B:
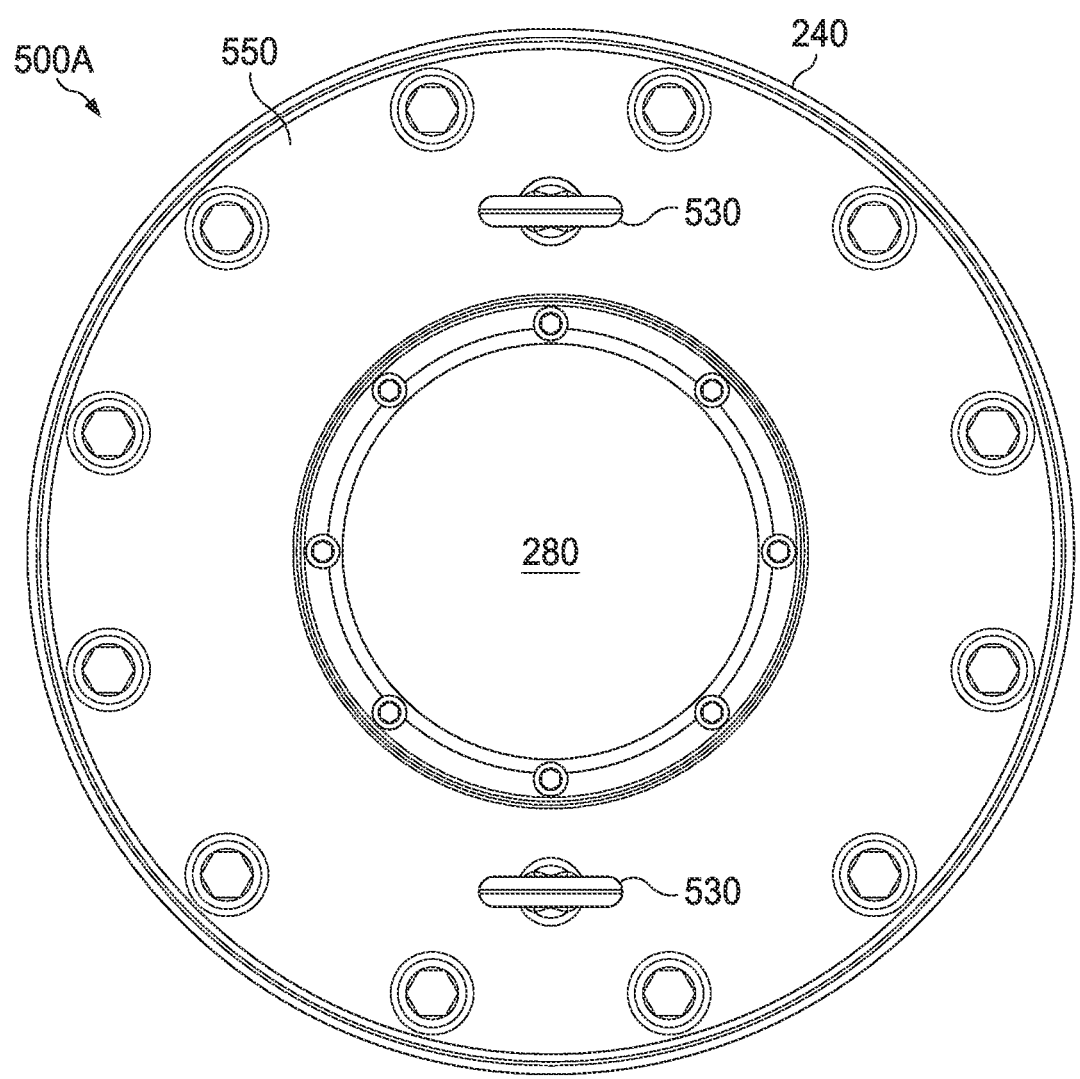
FIG. 5B shows a top plan view of the sealed seal and bearing assembly in accordance with one or more embodiments of the present invention.
Figure 5C:
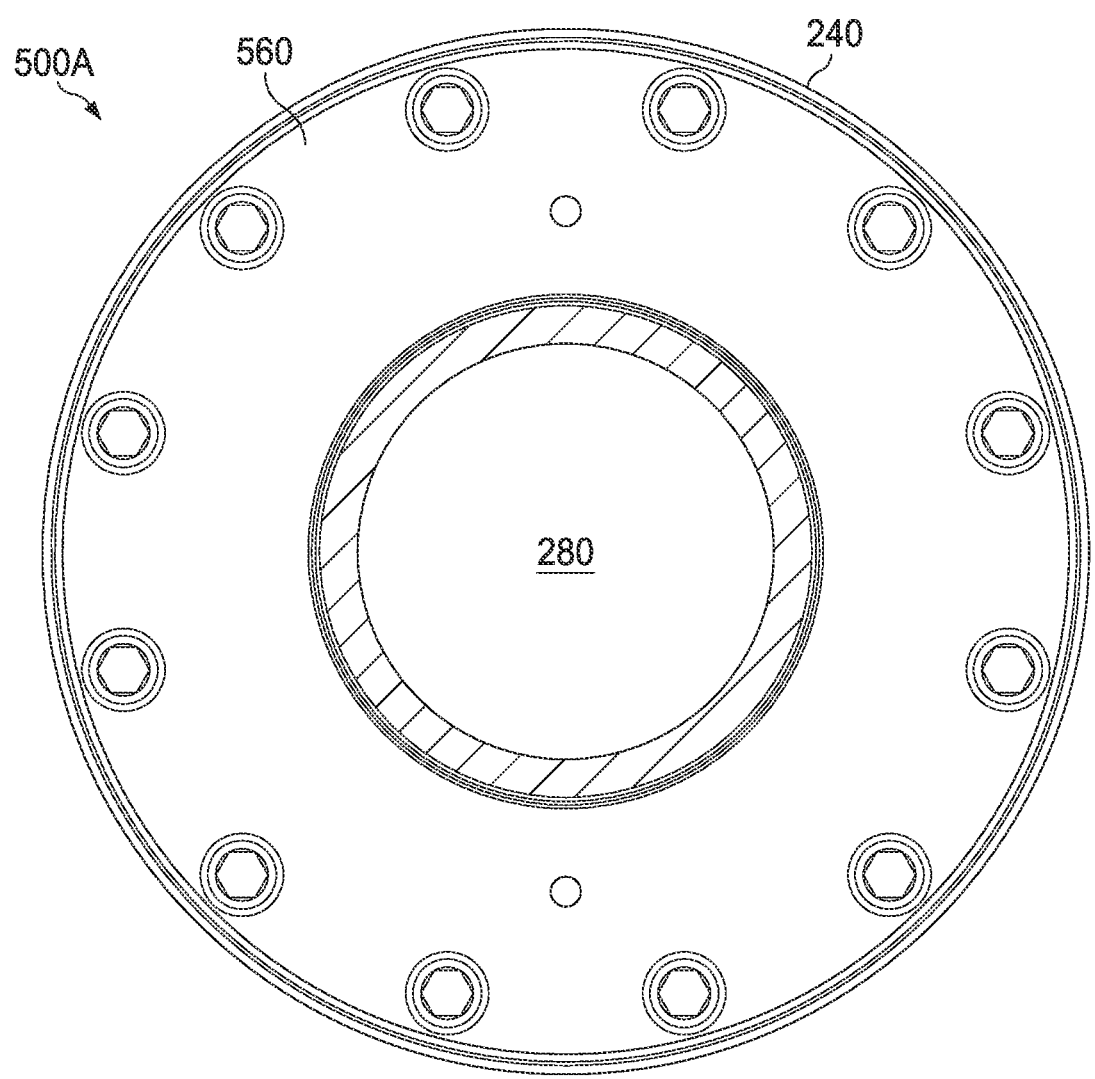
FIG. 5C shows a bottom plan view of the sealed seal and bearing assembly in accordance with one or more embodiments of the present invention.

Continuing, FIG. 5B shows a top plan view of the sealed seal and bearing assembly 500A in accordance with one or more embodiments of the present invention. A common lumen 280 may extend through seal and bearing assembly 500A. While the first interference-fit sealing element (not shown) may have an inner aperture slightly smaller than the drill pipe (not shown) anticipated to be disposed therethrough, the lumen 280 extends from distal end to distal end of seal and bearing assembly 500A. Continuing, FIG. 5C shows a bottom plan view of the sealed seal and bearing assembly 500A in accordance with one or more embodiments of the present invention. Seal and bearing assembly 500A may include a seal adapter 560 disposed on a bottom of seal and bearing housing 240 of seal and bearing assembly 500A. Seal adapter 560 may attach to the bottom distal end of the mandrel (not shown) of seal and bearing assembly 500A and be used to attach a first interference-fit sealing element (not shown).

Figure 5D:
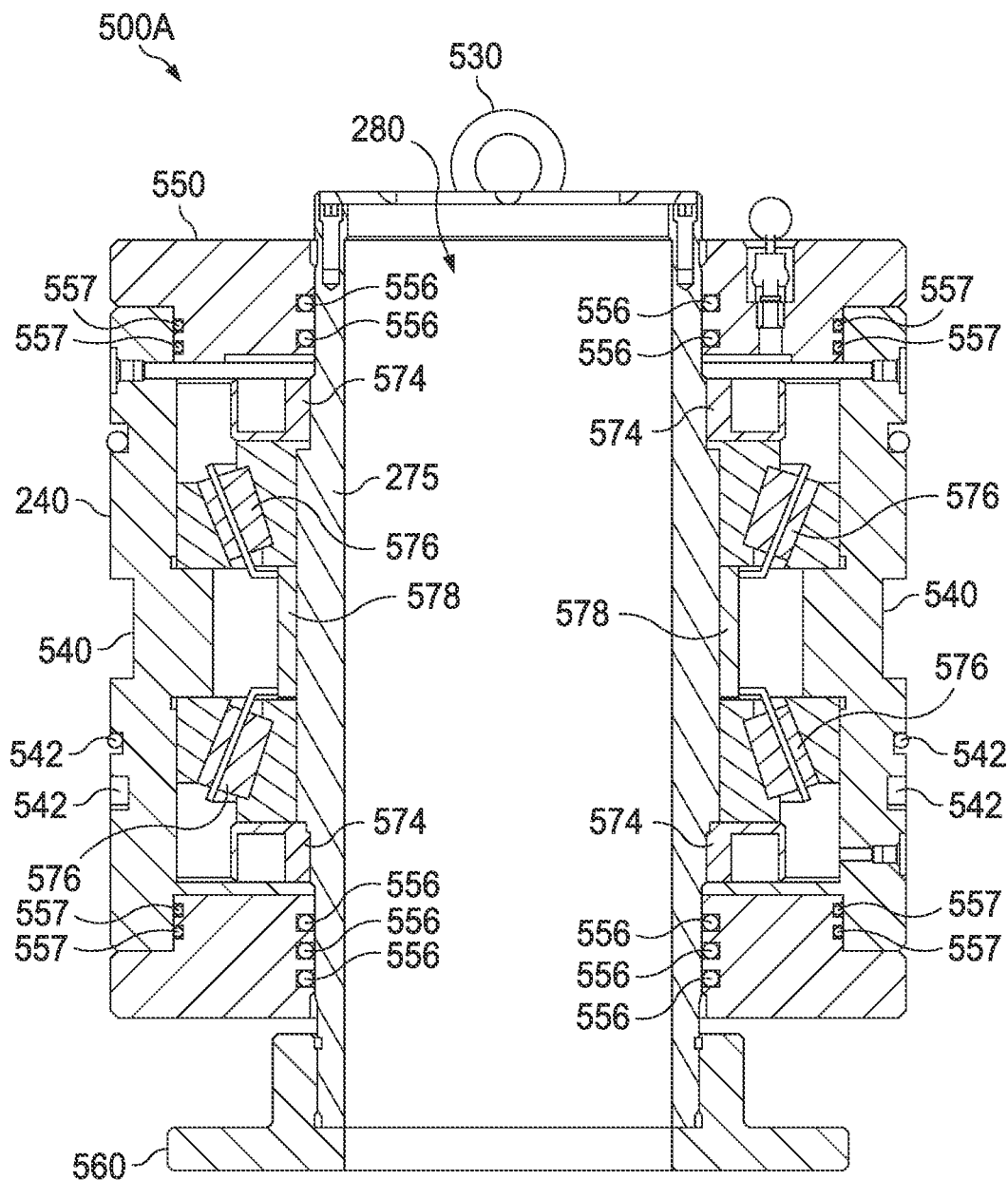
FIG. 5D shows a longitudinal cross section of the sealed seal and bearing assembly in accordance with one or more embodiments of the present invention.

Continuing, FIG. 5D shows a longitudinal cross section of the sealed seal and bearing assembly 500A in accordance with one or more embodiments of the present invention. Seal and bearing assembly 500A may include seal and bearing housing 240, a rotating mandrel 275 disposed within an inner aperture of seal and bearing housing 240, a first interference-fit sealing element (not shown) attached to a seal adapter 560 attached to the bottom distal end of mandrel 275, a plurality of tapered-thrust bearings 576 indirectly mounted to seal and bearing housing 240 to facilitate rotation of mandrel 275, a preload spacer 578 disposed between top and bottom tapered-thrust bearings 576, and a plurality of jam nuts 574 to adjust a preload of the tapered-thrust bearings 576. The plurality of tapered-thrust bearings 576 may be indirectly mounted to seal and bearing housing 240 at an offset angle to increase housing stability and prevent wear out from reciprocation of the drill pipe (not shown) disposed therethrough. A common lumen 280 extends from distal end to distal end of seal and bearing assembly 500A. The plurality of jam nuts 574 and seal adapter 560 may be threaded such that they maintain preload with rotation of the drill pipe (not shown).

Seal and bearing housing 240 may include a groove 540 that is substantially rectangular and non-tapered to receive a plurality of substantially rectangular piston-driven dogs (not shown) to controllably secure seal and bearing assembly 500A to rotating control device 100. One of ordinary skill in the art will recognize that the shape of the piston-driven dogs (not shown) and mating groove 540 may vary in shape and size in accordance with one or more embodiments of the present invention. One or more static sealing elements 542 may be disposed about an outer surface of seal and bearing housing 240 to provide a static seal between seal and bearing housing 240 and the bowl housing (e.g., 220). Lower seal carrier 555 may include a plurality of dynamic sealing elements 556 that contact rotating mandrel 275 and a plurality of static sealing elements 557 that contact seal and bearing housing 240. Upper seal carrier 550 may also include a plurality of dynamic sealing elements 556 and a plurality of static sealing elements 557. A lubricating grease (not independently illustrated) may be disposed within the seal and bearing housing 240 to lubricate the tapered-thrust bearings 576.

Figure 5E:
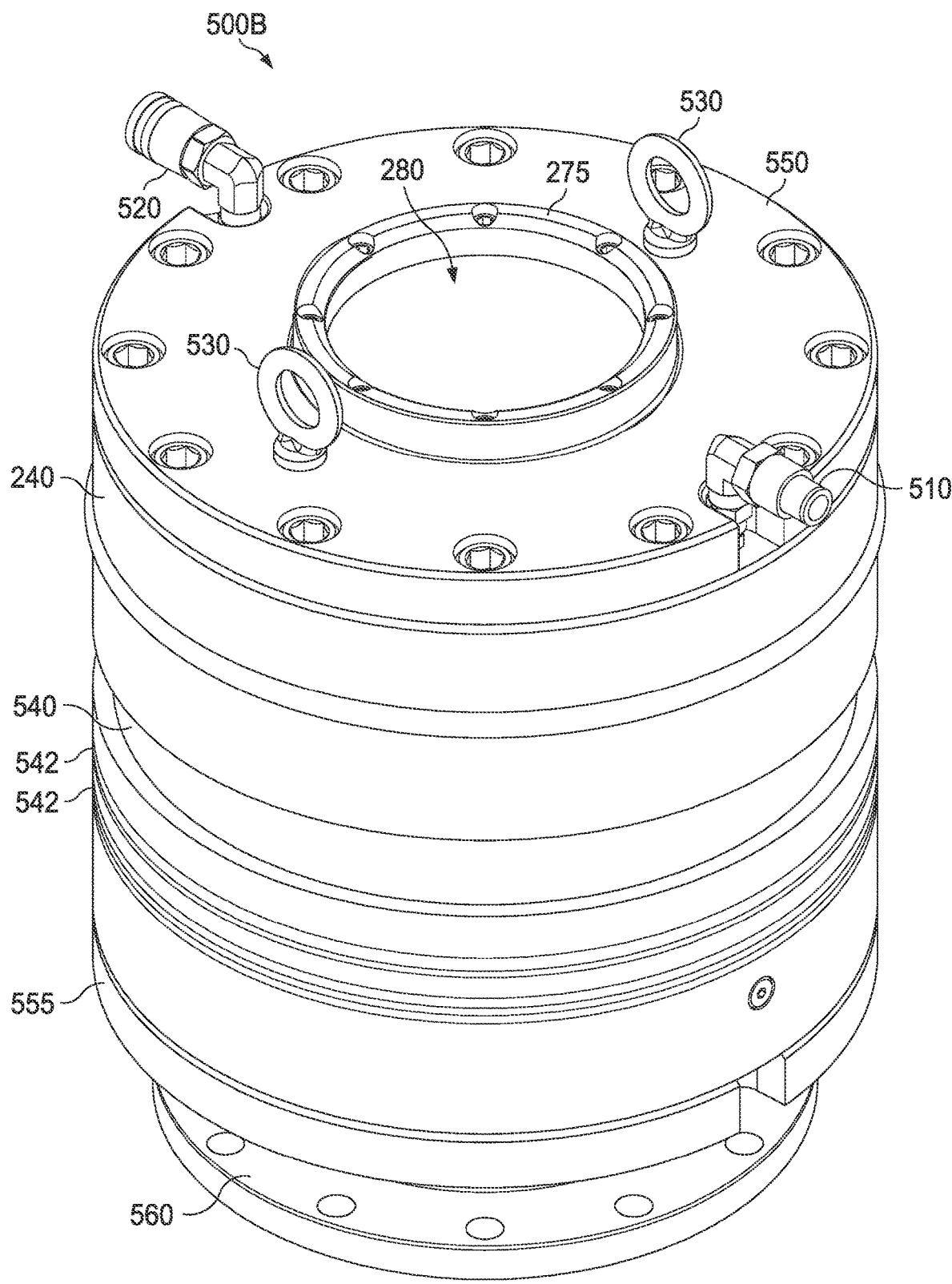
FIG. 5E shows a perspective view of a circulating lubricant bearing assembly in accordance with one or more embodiments of the present invention.

FIG. 5E shows a perspective view of a circulating lubricant seal and bearing assembly 500B in accordance with one or more embodiments of the present invention. Circulating lubricant seal and bearing assembly 500B may include a seal and bearing housing 240, a mandrel (not independently illustrated) disposed within an inner aperture of seal and bearing housing 240, a first interference-fit sealing element (not shown) attached to a bottom distal end of the mandrel (not independently illustrated) to perform a sealing function, a plurality of tapered-thrust bearings (not shown) indirectly mounted to seal and bearing housing 240 to facilitate rotation of the mandrel (not independently illustrated) and the first interference-fit sealing element (not shown), a preload spacer (not shown) disposed between top and bottom tapered-thrust bearings (not shown), and a plurality of jam nuts (not shown) to adjust a preload of the tapered-thrust bearings (not shown). Seal and bearing assembly 500B may include a top plate 550, also referred to as an upper seal carrier, disposed on top of seal and bearing housing 240 and a seal adapter 560 disposed on bottom of seal and bearing housing 240. A lower seal carrier 555 may be attached to the bottom side of seal and bearing housing 240 and a seal adapter 560 may be attached to a bottom distal end of mandrel 275 for attachment of the first interference-fit sealing element (not shown). A substantially rectangular groove 540 may be disposed about an outer surface of seal and bearing housing 240 to receive a plurality of substantially rectangular piston-driven dogs (not shown) when actuated by the plurality of hydraulically-actuated fail-last-position latching assemblies (not shown). One or more static seals 542 may be disposed about an outer surface of seal and bearing housing 240 to provide a static and non-rotating seal between seal and bearing housing 240 and the bowl housing (e.g., 220). A plurality of shop hooks 530 may be included to facilitate insertion and removal of seal and bearing assembly 500B into and out of rotating control device 100. A circulating lubricant may be injected via a lubricant injection port 520 and removed from a lubricant removal port 510. The injected lubricant may circulate within the bearing assembly of seal and bearing assembly 500B.

Figure 5F:
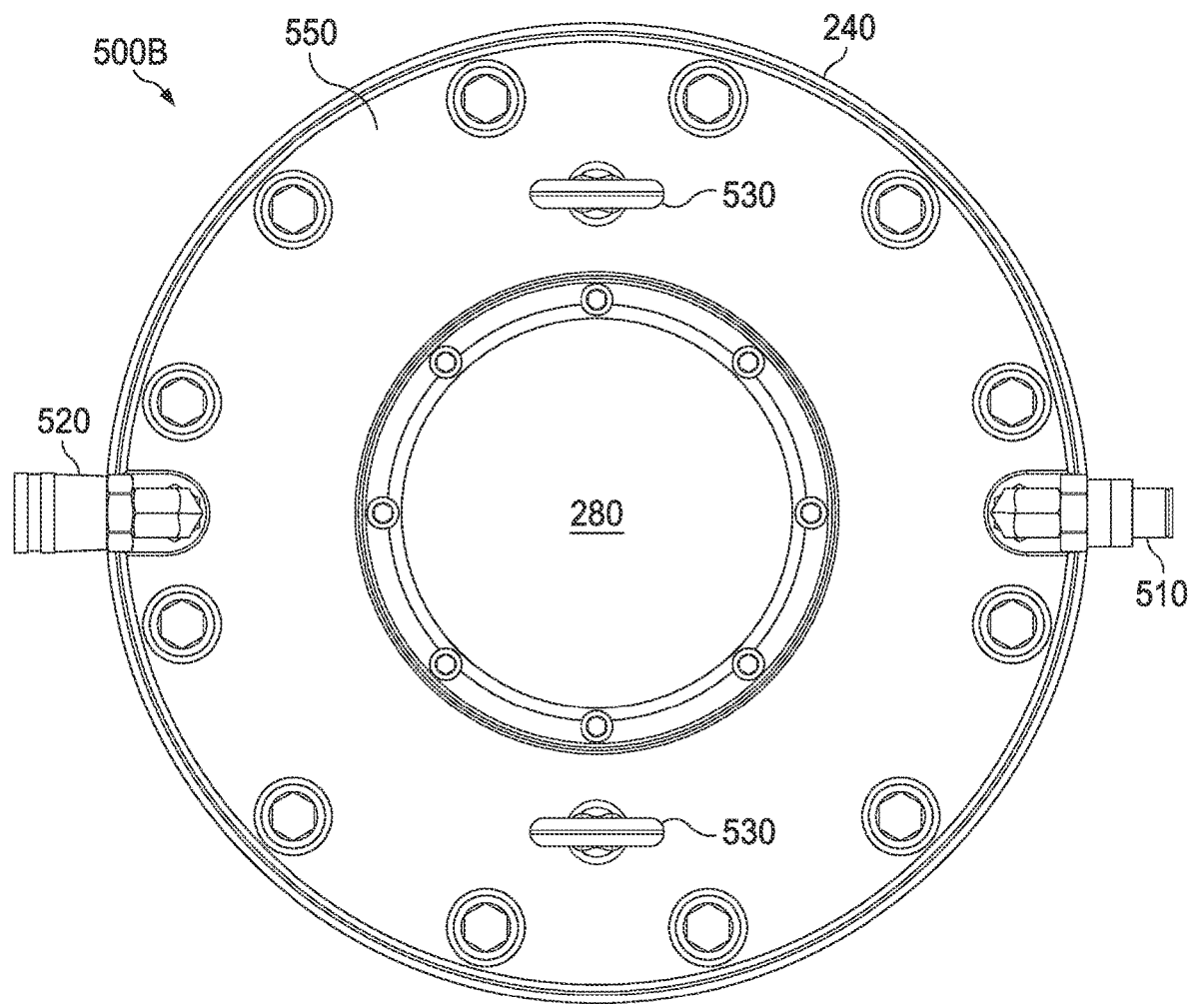
FIG. 5F shows a top plan view of the circulating lubricant bearing assembly in accordance with one or more embodiments of the present invention.
Figure 5G:
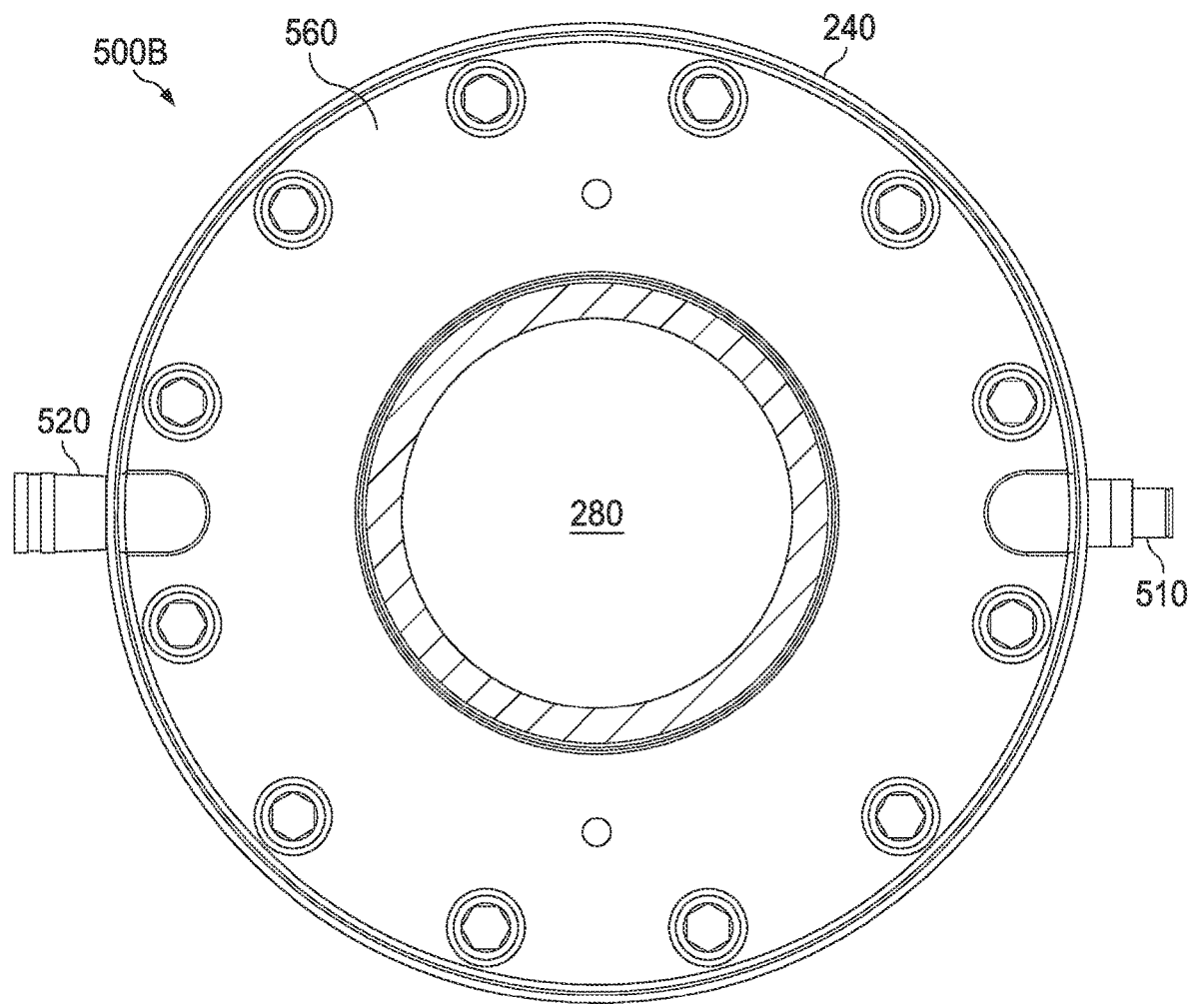
FIG. 5G shows a bottom plan view of the circulating lubricant bearing assembly in accordance with one or more embodiments of the present invention.

Continuing, FIG. 5F shows a top plan view of the circulating lubricant seal and bearing assembly 500B in accordance with one or more embodiments of the present invention. A common lumen 280 may extend through seal and bearing assembly 500B. While the first interference-fit sealing element (not shown) may have an inner aperture slightly smaller than the drill pipe (not shown) anticipated to be disposed therethrough, the lumen 280 extends from distal end to distal end of seal and bearing assembly 500B. Continuing, FIG. 5G shows a bottom plan view of the circulating lubricant seal and bearing assembly 500B in accordance with one or more embodiments of the present invention. Seal and bearing assembly 500B may include a seal adapter 560 disposed on a bottom of seal and bearing housing 240 of seal and bearing assembly 500B. Seal adapter 560 may attach to the bottom distal end of the mandrel (not shown) of seal and bearing assembly 500B and be used to attach a first interference-fit sealing element (not shown).

Figure 5H:
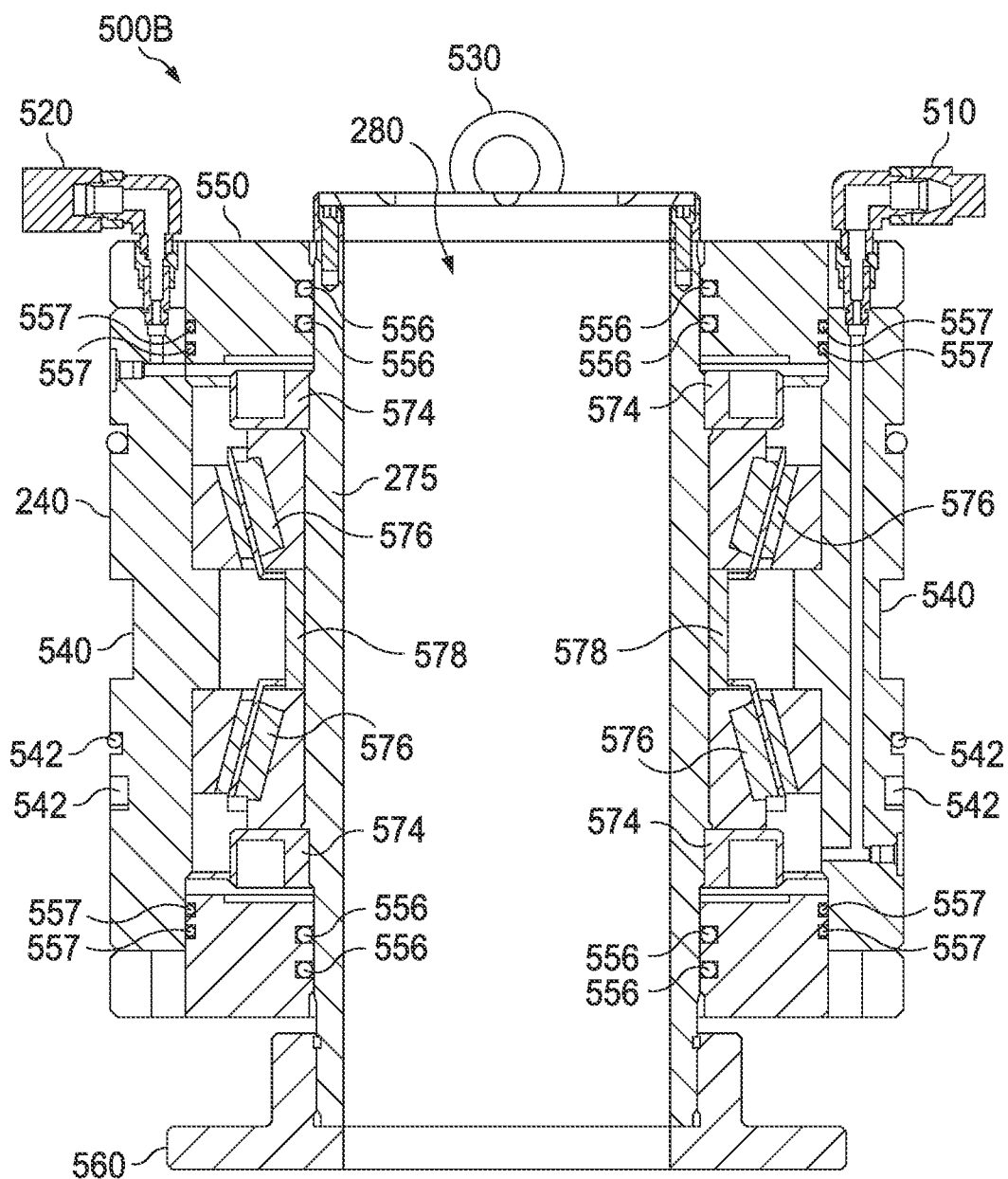
FIG. 5H shows a longitudinal cross section of the circulating lubricant bearing assembly in accordance with one or more embodiments of the present invention.

Continuing, FIG. 5H shows a longitudinal cross section of the circulating lubricant seal and bearing assembly 500B in accordance with one or more embodiments of the present invention. Seal and bearing assembly 500B may include seal and bearing housing 240, a mandrel 275 disposed within an inner aperture of seal and bearing housing 240, a first interference-fit sealing element (not shown) attached to a seal adapter 560 attached to the bottom distal end of mandrel 275, a plurality of tapered-thrust bearings 576 indirectly mounted to seal and bearing housing 240 to facilitate rotation of mandrel 275, a preload spacer 578 disposed between top and bottom tapered-thrust bearings 576, and a plurality of jam nuts 574 to adjust a preload of the tapered-thrust bearings 576. The plurality of tapered-thrust bearings 576 may be indirectly mounted to seal and bearing housing 240 at an offset angle to increase radial stability and prevent wear out from reciprocation of the drill pipe (not shown) disposed therethrough. A common lumen 280 extends from distal end to distal end of seal and bearing assembly 500B. The plurality of jam nuts 574 may be threaded such that they maintain preload with rotation of the drill pipe (not shown). Seal and bearing housing 240 may include a groove 540 that is substantially rectangular and non-tapered to receive a plurality of substantially rectangular piston-driven dogs (not shown) to controllably secure seal and bearing assembly 500B to rotating control device 100. One of ordinary skill in the art will recognize that the shape of the piston-driven dogs (not shown) and mating groove 540 may vary in shape and size in accordance with one or more embodiments of the present invention. One or more static sealing elements 542 may be disposed about an outer surface of seal and bearing housing 240 to provide a static seal between seal and bearing housing 240 and the bowl housing (e.g., 220). Lower seal carrier 555 may include a plurality of dynamic sealing elements 556 that contact rotating mandrel 275 and a plurality of static sealing elements 557 that contact seal and bearing housing 240. Upper seal carrier 550 may also include a plurality of dynamic sealing elements 556 and a plurality of static sealing elements 557. A circulating lubricant (not independently illustrated) may be injected via lubricant injection port 520, circulated within the bearing assembly 500, and removed via lubricant removal port 510.

Figure 6A:
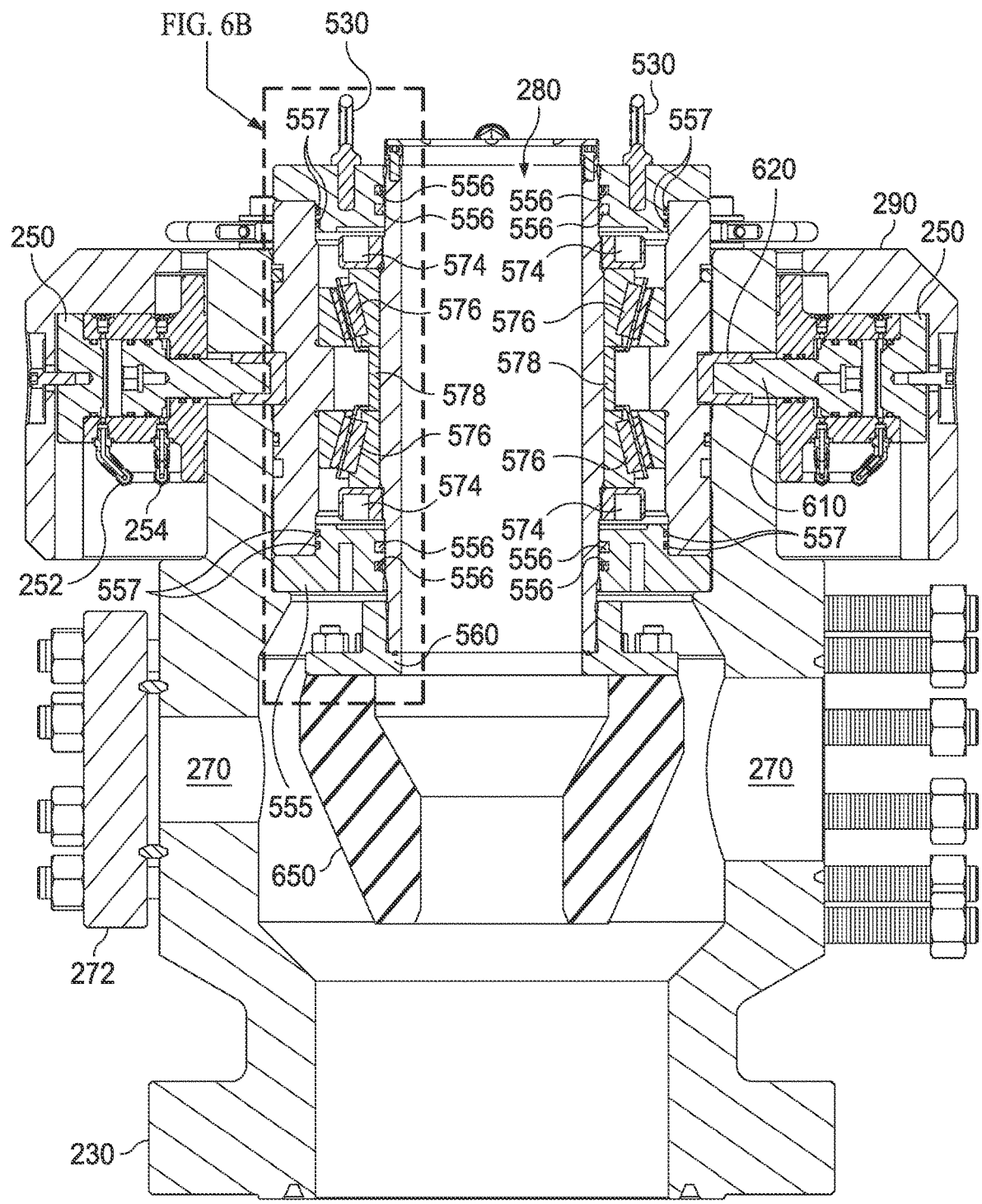
FIG. 6A shows a longitudinal cross section of the improved rotating control device with shroud showing engagement of the plurality of hydraulically-actuated piston-driven dogs in accordance with one or more embodiments of the present invention.

FIG. 6A shows a longitudinal cross section of the improved rotating control device 100 with shroud 290 showing engagement of the plurality of hydraulically-actuated piston-driven dogs 620 in accordance with one or more embodiments of the present invention. A seal adapter 560 may be attached to a bottom distal end of mandrel 275. A first interference-fit sealing element 650 may be attached to seal adapter 560. For example, sealing element 650 may be bolted to seal adapter 560. Each of a plurality of hydraulically-actuated fail-last-position latching assemblies 250 may include a piston-driven 610 dog 620 that fits within groove 540 of seal and bearing housing 240, thereby providing retention. Sealing elements 542, 556, 557 and first interference-fit sealing element 650 may seal an annulus between the drill pipe (not shown) and bowl housing 220. During drilling operations, the returning annular fluids may be directed from rotating control device 100 to the rig floor by way of one or more of the fluid flow ports (e.g., 270 of FIG. 7A).

The first interference-fit sealing element 650 and mandrel 275 may rotate with the drill pipe (not shown). The first interference-fit sealing element 650 may be composed of natural rubber, nitrile butadiene rubber, hydrogenated nitrile butadiene rubber, polyurethane, elastomeric material, or combinations thereof. The first interference-fit sealing element 650 may include a first seal lumen having a first seal inner aperture slightly smaller than an outer diameter of the drill pipe (not shown). The mandrel lumen, the first seal lumen, and the bottom flange lumen may form a common lumen 280 that extends from distal end to distal end of rotating control device 100. One of ordinary skill in the art will recognize that the lumens of each component may have a diameter that varies from component to component. During drilling operations, a drill pipe (not shown) may be disposed through the common lumen 280, whereby a first seal is established, in part, by the first interference-fit sealing element 650. The wellbore pressure may be managed by a surface-backpressure choke manifold (not shown) disposed on the rig floor (not shown) that manipulates the fluid flow rate from one or more fluid flow ports 270 to the surface.

Figure 6B:
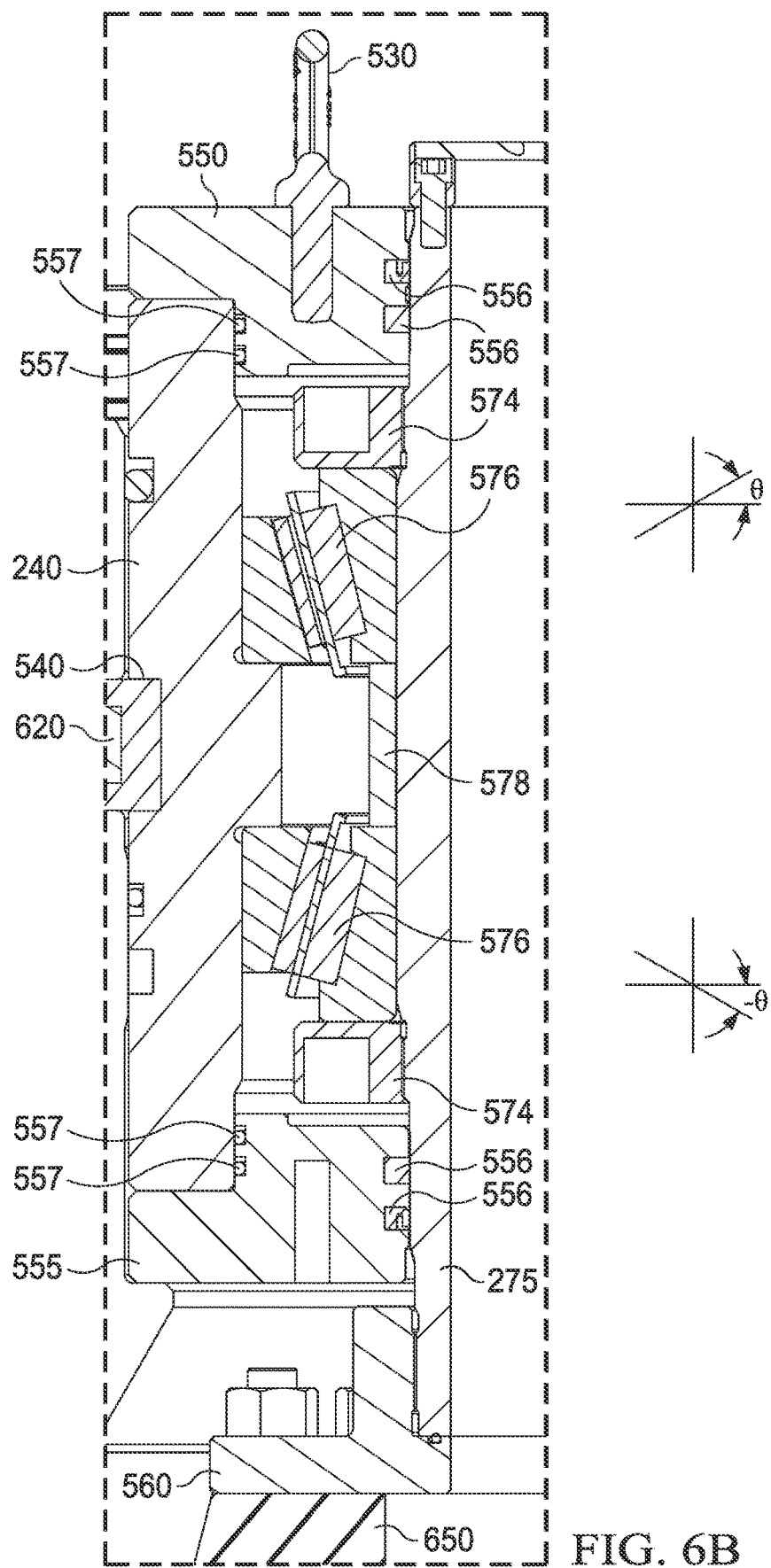
FIG. 6B shows a detailed cross-sectional view of a portion of the improved rotating control device with shroud showing engagement of the plurality of hydraulically-actuated piston-driven dogs, tapered-thrust bearings, preload spacer, and jam nuts in accordance with one or more embodiments of the present invention.

Continuing, FIG. 6B shows a detailed cross-sectional view of a portion of the improved rotating control device 100 with shroud 290 showing engagement of the plurality of hydraulically-actuated piston-driven dogs 620, tapered-thrust bearings 576, preload spacer 578, and jam nuts 574 in accordance with one or more embodiments of the present invention. A plurality of tapered-thrust bearings 576 may be indirectly mounted at an offset angle to increase radial stability.

In certain embodiments, the top tapered-thrust bearings 576 may be indirectly mounted at an offset angle, θ, in a range between 10 degrees and 40 degrees from a perpendicular line to a longitudinal axis of rotating control device 100. In other embodiments, the top tapered-thrust bearings 576 may be indirectly mounted at an offset angle, θ, in a range between 20 degrees and 30 degrees from a perpendicular line to a longitudinal axis of rotating control device 100. In still other embodiments, the top tapered-thrust bearings 576 may be indirectly mounted at an offset angle, θ, in a range between 0 degrees and 50 degrees from a perpendicular line to a longitudinal axis of rotating control device 100. One of ordinary skill in the art will recognize that the positive offset angle of the top tapered-thrust bearings 576 may vary based on an application or design in accordance with one or more embodiments of the present invention.

The bottom tapered-thrust bearings 576 may be indirectly mounted at an offset angle, −θ, in a range between −10 degrees and −40 degrees from a perpendicular line to a longitudinal axis of rotating control device 100. In other embodiments, the bottom tapered-thrust bearings 576 may be indirectly mounted at an offset angle, −θ, in a range between −20 degrees and −30 degrees from a perpendicular line to a longitudinal axis of rotating control device 100. In still other embodiments, the top tapered-thrust bearings 576 may be indirectly mounted at an offset angle, −θ, in a range between 0 degrees and −50 degrees from a perpendicular line to a longitudinal axis of rotating control device 100. One of ordinary skill in the art will recognize that the negative offset angle of the bottom tapered-thrust bearings 576 may vary based on an application or design in accordance with one or more embodiments of the present invention.

A plurality of jam nuts 574 may be used to preload the plurality of tapered-thrust bearings 576, the top and bottom of which, are separated by a preload spacer 578. The jam nuts 574 may be tightened or loosened to adjust a preload on the tapered-thrust bearings 576 and preload spacer 578. Upper seal carrier 550, the plurality of jam nuts 574, and lower seal carrier 555 may be threaded or otherwise attached such that they maintain the preload during rotation of the drill pipe (not shown).

Figure 7A:
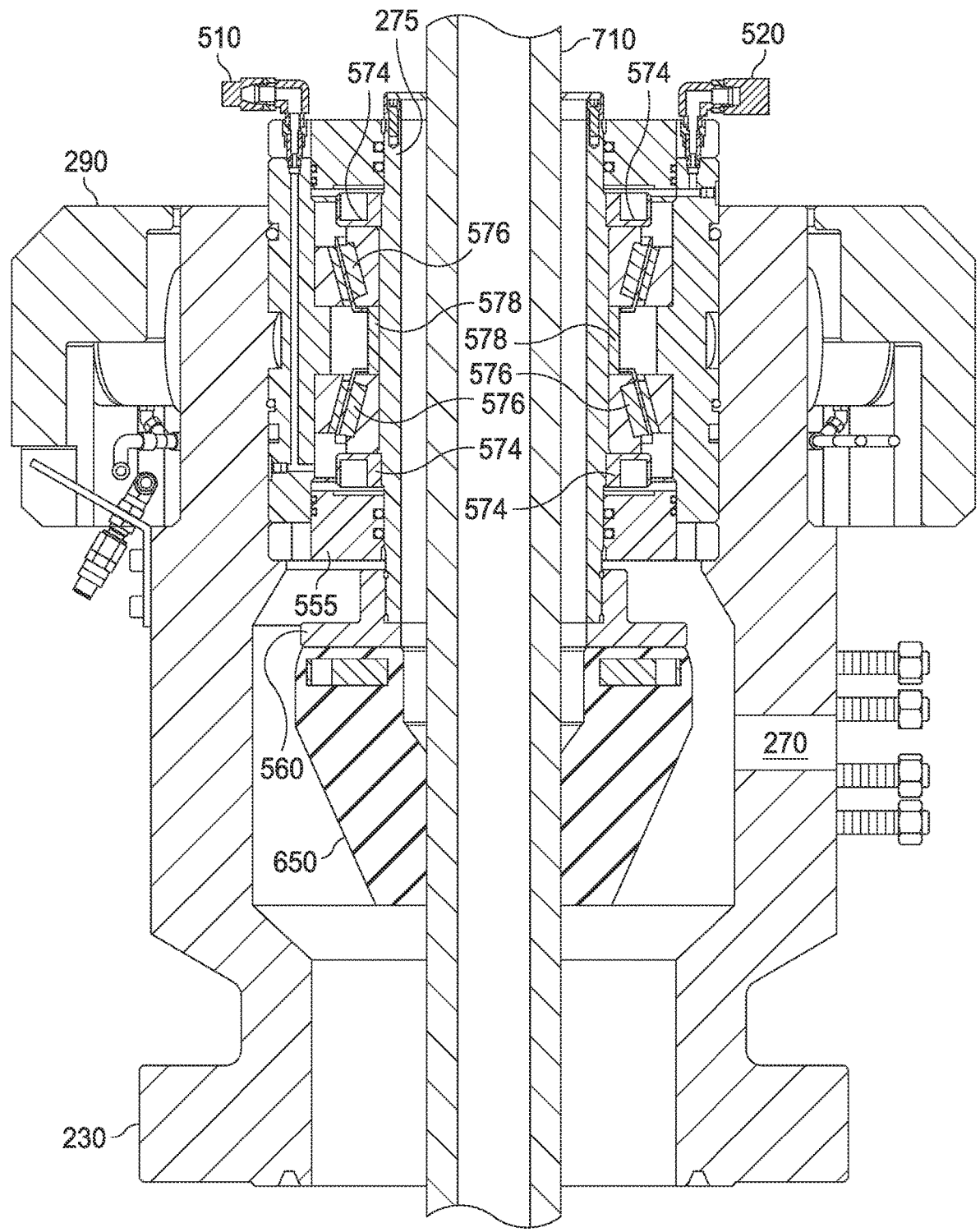
FIG. 7A shows a longitudinal cross section of an improved rotating control device with shroud showing seal engagement with drill pipe in accordance with one or more embodiments of the present invention.

FIG. 7A shows a longitudinal cross section of an improved rotating control device 100 with shroud 290 showing seal engagement with drill pipe 710 in accordance with one or more embodiments of the present invention. When the drill string is tripped in, drill pipe 710 may be disposed through the common lumen 280 of rotating control device 100. The first interference-fit sealing element 650 may form a seal about drill pipe 710, thereby sealing the annulus between drill pipe 710 and bowl housing 220. The returning annular fluids (not shown) may be diverted from bowl housing 220 to the surface of the platform (not shown) by way of one or more fluid flow ports 270.

Figure 7B:
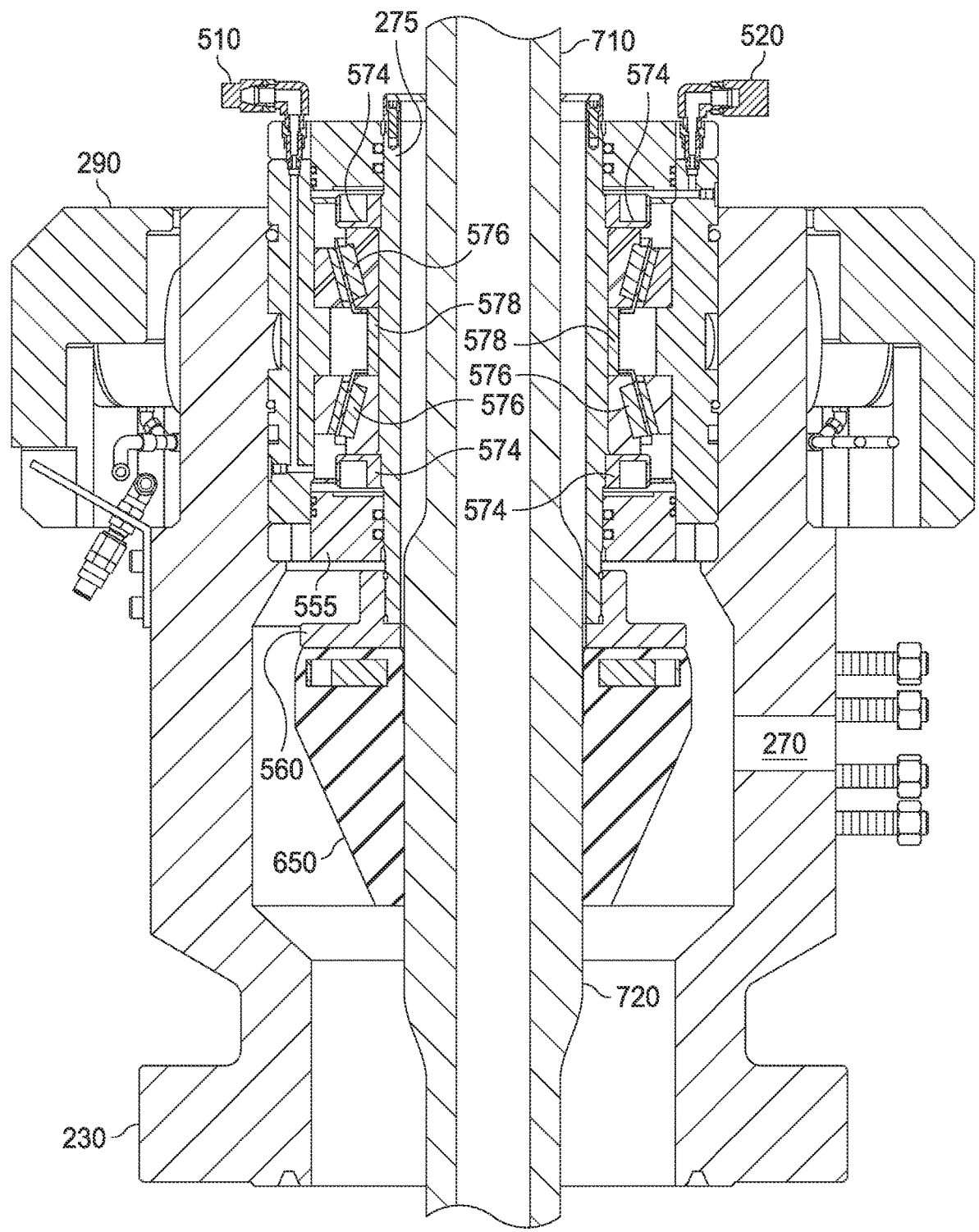
FIG. 7B shows a longitudinal cross section of the improved rotating control device with shroud showing seal engagement with drill pipe having a tool joint in accordance with one or more embodiments of the present invention.

Continuing, FIG. 7B shows a longitudinal cross section of the improved rotating control device 100 with shroud 290 showing seal engagement with drill pipe 710 having a tool joint 720 in accordance with one or more embodiments of the present invention. Because the first interference-fit sealing element 650 is composed of flexible material(s), when drill pipe 710 is tripped into or out of the hole, a tool joint 720 may pass through rotating control device 100 while maintaining the annular seal. In this way, pressure may be maintained during tripping in and out of the hole.

Figure 8A:
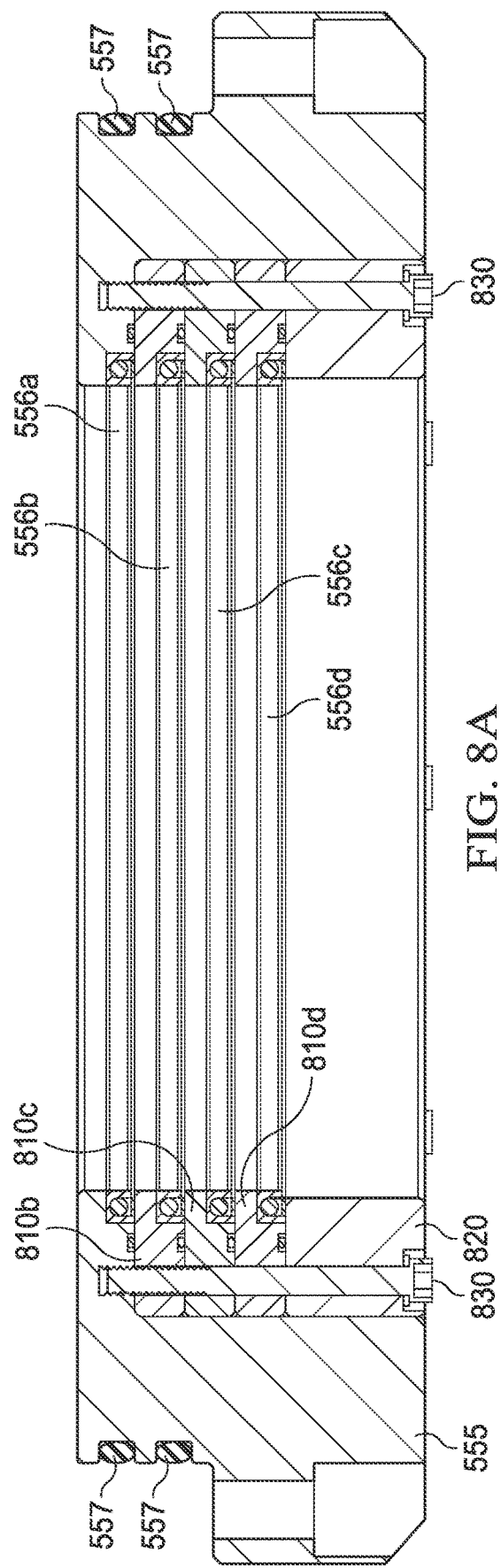
FIG. 8A shows a cross-sectional view of a lower seal carrier of a seal and bearing assembly in accordance with one or more embodiments of the present invention.

FIG. 8A shows a cross-sectional view of a lower seal carrier 555 of a seal and bearing assembly 500 in accordance with one or more embodiments of the present invention. The proper function of the plurality of sealing elements 556 is critically important to maintain the annular seal surrounding the drill pipe (not shown). In embodiments previously depicted, the plurality of sealing elements 556 were disposed in grooves formed on an inner circumferential surface of the lower seal carrier 555 itself. Because of their location, it has been discovered that, over time, these sealing elements 556 wear into the carrier 555 and become very difficult to remove and ultimately replace. Typically, a field hand must use a screw driver or other blunt instrument to pry the worn sealing elements 556 off of the lower seal carrier 555, potentially damaging the seal carrier 555 and impacting its ability to maintain the annular seal. As such, in certain embodiments, lower seal carrier 555 may be modified as shown in FIGS. 8A through 8C to include a plurality of removable seal carrier trays 810 and a seal plate 820 to facilitate the quick and easy removal and replacement of sealing elements 556 in the field.

Figure 8B:
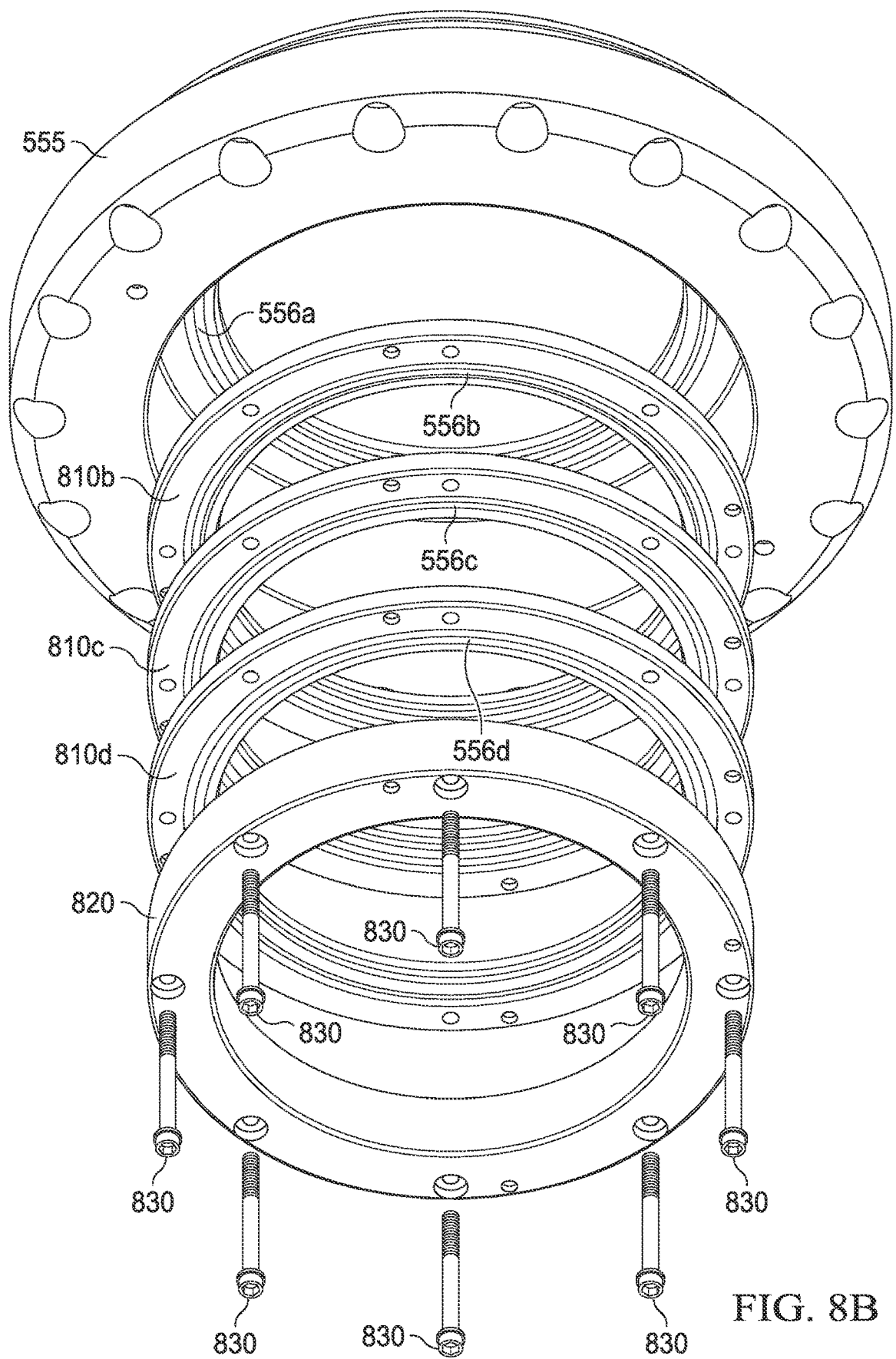
FIG. 8B shows an exploded bottom-facing perspective view of the lower seal carrier of the seal and bearing assembly in accordance with one or more embodiments of the present invention.

Continuing, FIG. 8B shows an exploded bottom-facing perspective view of the lower seal carrier 555 of the seal and bearing assembly 500 in accordance with one or more embodiments of the present invention. A first sealing element 556a may be disposed in a groove formed in lower seal carrier 555. Each of a second 556b, a third 556c, and a fourth 556d sealing element may be disposed in their own respective seal carrier trays 810. Each seal carrier tray 810 includes an inner circumferential surface that receives a sealing element 556 and a plurality of mounting holes (not independently illustrated) to receive a plurality of mounting bolts 830. As such, when installing the plurality of sealing elements 556, a first sealing element 556a may be disposed within the groove formed in lower seal carrier 555, a second sealing element 556b may be disposed within a seal carrier tray 810b and tray 810b may be disposed within lower seal carrier 555, a third sealing element 556c may be disposed within a seal carrier tray 810c and tray 810c may be disposed within lower seal carrier 555, and a fourth sealing element 556d may be deposed within seal carrier tray 810d and tray 810d may be disposed within lower seal carrier 555. A seal plate 820 may be disposed over the fourth sealing element 556d and a plurality of bolts 830 may be used to secure seal plate 820, as well as the plurality of sealing elements 556 disposed within their respective seal trays 810, to lower seal carrier 555.

Figure 8C:
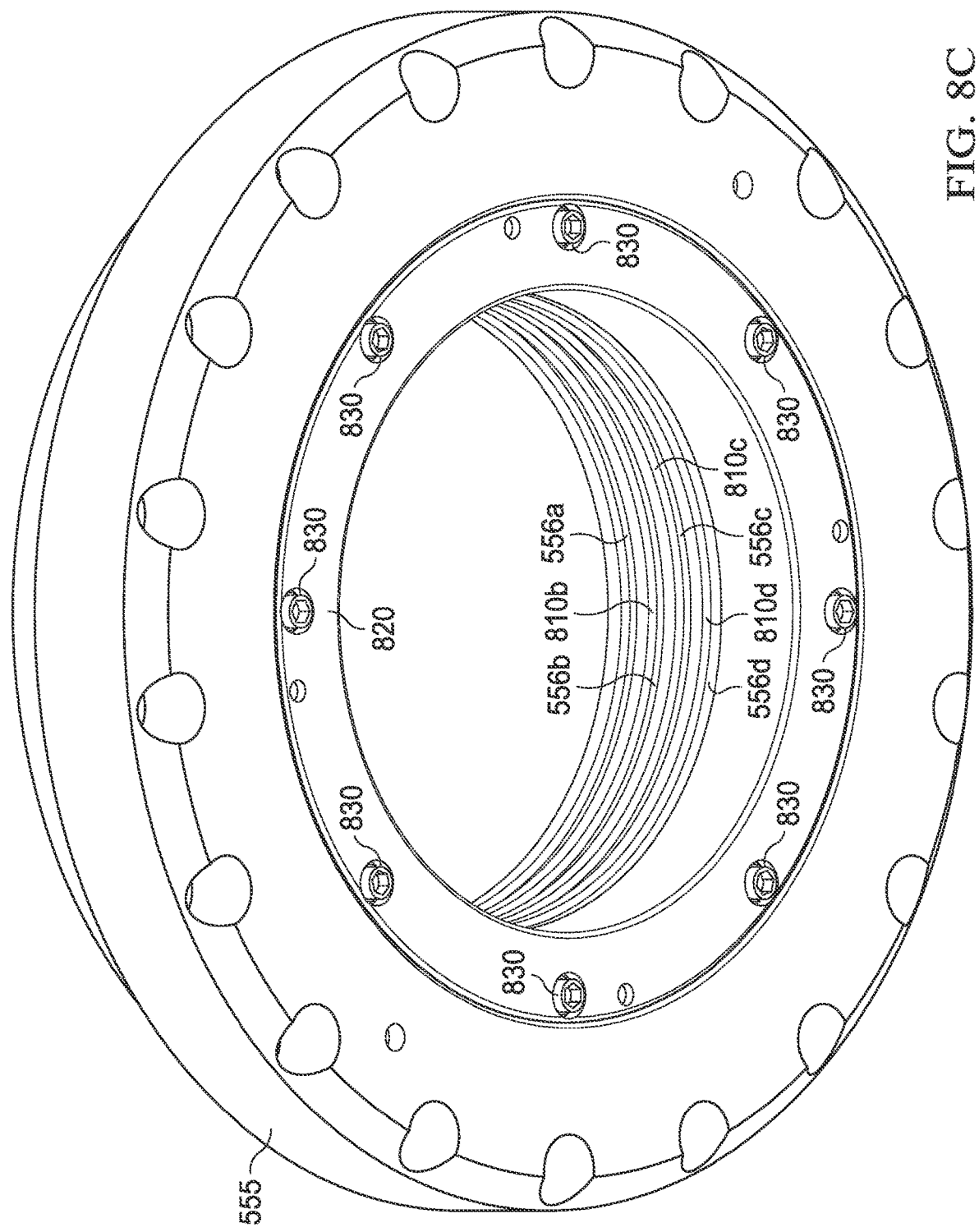
FIG. 8C shows a bottom-facing perspective view of the lower seal carrier of the seal and bearing assembly in accordance with one or more embodiments of the present invention.

Continuing, FIG. 8C shows a bottom-facing perspective view of the lower seal carrier 555 of the seal and bearing assembly 500 in accordance with one or more embodiments of the present invention. Once modified lower seal carrier 555 has been assembled, it may be installed as part of seal and bearing assembly 500 in exactly the same manner as other embodiments described herein and functions the same way. While the modified lower seal carrier 555 includes four (4) sealing elements, one of ordinary skill in the art will recognize that the plurality of sealing elements 556 may vary based on an application or design in accordance with one or more embodiments of the present invention.

Advantages of one or more embodiments of the present invention may include one or more of the following:

In one or more embodiments of the present invention, an improved rotating control device has a simplified design that includes fewer parts, costs less to manufacture, reduces cost of ownership, and has a reduced and less expensive maintenance schedule.

In one or more embodiments of the present invention, an improved rotating control device provides a unique seal carrier design that allows bearing assemblies to be easily serviced or replaced with a significant reduction in non-productive time and associated costs.

In one or more embodiments of the present invention, an improved rotating control device includes a unique seal carrier design with highly accurate bearing preload that extends the productive life of the rotary seal. The seal carrier can be removed without having to refurbish the internal bearings. The preload of the bearings may be precisely managed without the use of springs or shims.

In one or more embodiments of the present invention, an improved rotating control device includes indirectly mounted tapered-thrust bearings that increase radial load capacity and stability.

In one or more embodiments of the present invention, an improved rotating control device includes pilot operated, and hydraulically actuated, latching dogs that fail in their last position to ensure engagement when power is lost.

In one or more embodiments of the present invention, an improved rotating control device provides improved static ratings from five hundred (500) pounds per square inch ("PSI") to five thousand (5000) PSI.

In one or more embodiments of the present invention, an improved rotating control device provides improved rotation rate up to at least two hundred and twenty (220) revolutions per minute ("RPM").

While the present invention has been described with respect to the above-noted embodiments, those skilled in the art, having the benefit of this disclosure, will recognize that other embodiments may be devised that are within the scope of the invention as disclosed herein. Accordingly, the scope of the invention should be limited only by the appended claims.

What is claimed is:

1. A circulating lubricant seal and bearing assembly comprising:
   a seal and bearing housing;
   a rotatable mandrel disposed within an inner aperture of the seal and bearing housing;
   an upper seal carrier attached to a top side of the seal and bearing housing comprising a dynamic sealing element that contacts the rotatable mandrel;
   a plurality of tapered-thrust bearings to facilitate rotation of the rotatable mandrel, wherein the plurality of tapered-thrust bearings comprise top tapered-thrust bearings indirectly mounted at a positive offset angle from a perpendicular line to a longitudinal axis of the rotating control device and bottom tapered-thrust bearings indirectly mounted at a negative offset angle from the perpendicular line to the longitudinal axis of the rotating control device;
   a preload spacer disposed between the top and bottom tapered-thrust bearings; and
   a lower seal carrier attached to a bottom side of the seal and bearing housing comprising a plurality of removable seal carrier trays, wherein a plurality of dynamic sealing elements that contact the rotatable mandrel are removably disposed within the plurality of removable seal carrier trays.

2. The circulating lubricant seal and bearing assembly of claim 1, further comprising:
   a fluid injection port to inject lubricating fluid at a higher pressure than a wellbore to lubricate the tapered-thrust bearings.

3. The circulating lubricant seal and bearing assembly of claim 1, wherein top tapered-thrust bearings are indirectly mounted at an offset angle in a range between 10 degrees and 40 degrees from the perpendicular line to the longitudinal axis of the rotating control device.

4. The circulating lubricant seal and bearing assembly of claim 1, wherein bottom tapered-thrust bearings are indirectly mounted at an offset angle in a range between −10 degrees and −40 degrees from the perpendicular line to the longitudinal axis of the rotating control device.

5. The circulating lubricant seal and bearing assembly of claim 1, wherein the back-to-back orientation of the top and bottom tapered-thrust bearings increases radial stability.

6. A sealed seal and bearing assembly comprising:
   a seal and bearing housing;
   a rotatable mandrel disposed within an inner aperture of the seal and bearing housing;
   an upper seal carrier attached to a top side of the seal and bearing housing comprising a dynamic sealing element that contacts the rotatable mandrel;
   a plurality of tapered-thrust bearings to facilitate rotation of the rotatable mandrel, wherein the plurality of tapered-thrust bearings comprise top tapered-thrust bearings indirectly mounted at a positive offset angle from a perpendicular line to a longitudinal axis of the rotating control device and bottom tapered-thrust bearings indirectly mounted at a negative offset angle from the perpendicular line to the longitudinal axis of the rotating control device;
   a preload spacer disposed between the top and bottom tapered-thrust bearings; and
   a lower seal carrier attached to a bottom side of the seal and bearing housing comprising a plurality of removable seal carrier trays, wherein a plurality of dynamic sealing elements that contact the rotatable mandrel are removably disposed within the plurality of removable seal carrier trays.

7. The sealed seal and bearing assembly of claim 6, further comprising:
   a lubricating grease disposed within the seal and bearing housing to lubricate the tapered-thrust bearings.

8. The sealed seal and bearing assembly of claim 6, wherein top tapered-thrust bearings are indirectly mounted at an offset angle in a range between 10 degrees and 40 degrees from the perpendicular line to the longitudinal axis of the rotating control device.

9. The sealed seal and bearing assembly of claim 6, wherein bottom tapered-thrust bearings are indirectly mounted at an offset angle in a range between −10 degrees and −40 degrees from the perpendicular line to the longitudinal axis of the rotating control device.

10. The sealed seal and bearing assembly of claim 6, wherein the back-to-back orientation of the top and bottom tapered-thrust bearings increases radial stability.

11. A rotating control device comprising:
    a bowl housing comprising an inner aperture to receive a removably disposed seal and bearing assembly; and
    a seal and bearing assembly comprising:
       a seal and bearing housing,
       a rotatable mandrel disposed within an inner aperture of the seal and bearing housing,
       an upper seal carrier attached to a top side of the seal and bearing housing comprising a dynamic sealing element that contacts the rotatable mandrel,
       a plurality of tapered-thrust bearings to facilitate rotation of the rotatable mandrel, wherein the plurality of tapered-thrust bearings comprise top tapered-thrust bearings indirectly mounted at a positive offset angle from a perpendicular line to a longitudinal axis of the rotating control device and bottom tapered-thrust bearings indirectly mounted at a negative offset angle from the perpendicular line to the longitudinal axis of the rotating control device,
       a preload spacer disposed between the top and bottom tapered-thrust bearings, and
       a lower seal carrier attached to a bottom side of the seal and bearing housing comprising a plurality of removable seal carrier trays, wherein a plurality of dynamic sealing elements that contact the rotatable mandrel are removably disposed within the plurality of removable seal carrier trays.

12. The rotating control device of claim 11, wherein top tapered-thrust bearings are indirectly mounted at an offset angle in a range between 10 degrees and 40 degrees from the perpendicular line to the longitudinal axis of the rotating control device.

13. The rotating control device of claim 11, wherein bottom tapered-thrust bearings are indirectly mounted at an offset angle in a range between −10 degrees and −40 degrees from the perpendicular line to the longitudinal axis of the rotating control device.

14. The rotating control device of claim 11, wherein the back-to-back orientation of the top and bottom tapered-thrust bearings increases radial stability.

* * * * *